(12) United States Patent
Loghmani

(10) Patent No.: US 10,803,249 B2
(45) Date of Patent: Oct. 13, 2020

(54) CONVOLUTIONAL STATE MODELING FOR PLANNING NATURAL LANGUAGE CONVERSATIONS

(71) Applicant: Seyed Ali Loghmani, San Jose, CA (US)

(72) Inventor: Seyed Ali Loghmani, San Jose, CA (US)

( * ) Notice: Subject to any disclaimer, the term of this patent is extended or adjusted under 35 U.S.C. 154(b) by 150 days.

(21) Appl. No.: 16/101,504

(22) Filed: Aug. 12, 2018

(65) Prior Publication Data

US 2019/0251169 A1 Aug. 15, 2019

Related U.S. Application Data

(63) Continuation-in-part of application No. 15/894,733, filed on Feb. 12, 2018, now abandoned.

(60) Provisional application No. 62/457,990, filed on Feb. 12, 2017.

(51) Int. Cl.
*G06F 40/30* (2020.01)
*G06F 40/295* (2020.01)

(52) U.S. Cl.
CPC ............ *G06F 40/30* (2020.01); *G06F 40/295* (2020.01)

(58) Field of Classification Search
CPC ........ G06F 40/295; G06F 40/30; G06F 40/35; G06F 16/144; G06F 16/156; G06F 16/24; G06F 16/242; G06F 16/245; G06F 16/33; G06F 16/332; G06F 16/3331; G06F 16/33338; G06F 16/338; G06F 16/83; G06F 16/832; G06F 16/835; G06F 16/903; G06F 16/9032; G06F 16/90335
See application file for complete search history.

(56) References Cited

U.S. PATENT DOCUMENTS

| | | | | |
|---|---|---|---|---|
| 7,805,303 | B2 * | 9/2010 | Sugihara | G10L 15/1822 704/257 |
| 2003/0126136 | A1 * | 7/2003 | Omoigui | H04L 29/06 |
| 2008/0235203 | A1 * | 9/2008 | Case | G06F 16/3338 |
| 2010/0241639 | A1 * | 9/2010 | Kifer | G06F 16/345 707/754 |
| 2014/0006012 | A1 * | 1/2014 | Zhou | G06F 16/3344 704/9 |
| 2015/0066479 | A1 * | 3/2015 | Pasupalak | G06F 40/40 704/9 |

(Continued)

OTHER PUBLICATIONS

Sidorov, Grigori, et al. "Soft similarity and soft cosine measure: Similarity of features in vector space model." Computación y Sistemas 18.3 (2014): 491-504. (Year: 2014).*

*Primary Examiner* — Paras D Shah

(57) ABSTRACT

In one aspect, a computerized method useful for, with an ensemble of Natural Language Understanding and Processing methods converting a set of user actions into machine queries, includes the step of providing a knowledge model. The method includes the step of receiving a natural language user query; preprocesses the natural language user query for further processing as a preprocessed user query. The preprocessing includes the step of chunking a set of sentences of the natural language query into a set of smaller sentences and retaining the reference between chunks of the set of sentences. The method includes the step of, with the preprocessed user query. For each chunk of the chunked preprocessed user query the method implements the following steps.

14 Claims, 13 Drawing Sheets

(56) References Cited

U.S. PATENT DOCUMENTS

| | | | |
|---|---|---|---|
| 2015/0356146 A1* | 12/2015 | Yamashita | G06Q 10/105 |
| | | | 707/722 |
| 2016/0140216 A1* | 5/2016 | Allen | G06N 20/00 |
| | | | 707/722 |
| 2017/0060366 A1* | 3/2017 | Alexander | G06F 11/3089 |
| 2018/0103052 A1* | 4/2018 | Choudhury | G06F 21/566 |
| 2018/0253432 A1* | 9/2018 | Abu-Saba | G06F 16/285 |
| 2018/0341871 A1* | 11/2018 | Maitra | G06N 5/046 |
| 2019/0163691 A1* | 5/2019 | Brunet | G06F 16/3329 |
| 2019/0164064 A1* | 5/2019 | Li | G06N 20/00 |
| 2020/0050636 A1* | 2/2020 | Datla | G06F 16/248 |

* cited by examiner

US 10,803,249 B2

CONVOLUTIONAL STATE MODELING FOR PLANNING NATURAL LANGUAGE CONVERSATIONS

CLAIM OF PRIORITY AND INCORPORATION BY REFERENCE

This application claims priority from U.S. application Ser. No. 15,894,733, title METHOD AND SYSTEM OF A CONVERSATIONAL-SEARCH ENGINE and filed Feb. 12, 2018. U.S. application Ser. No. 15,894,733 claims priority from U.S. Provisional Application No. 62/457,990, title METHOD AND SYSTEM OF A CONVERSATIONAL-SEARCH ENGINE and filed Feb. 12, 2017. These applications are hereby incorporated by reference in their entirety for all purposes.

FIELD OF THE INVENTION

The invention is in the field of computerized natural language processing and more specifically to a method, system and apparatus of convolutional state modeling for planning natural language conversations.

Description of the Related Art

For millennia books have been the main source of learning for self-taught individuals. With the advent of the Internet a proliferation of blogs/vlogs, people spend more time scanning shorter and more relevant pieces of content. However, with information overload, it is known that an overabundance of information may not produce a better learning experience. At the same time, the ancient technique of coaching remains a very effective method to teach someone a new skill.

Accordingly, there is needed new computerized methods to automatically understand a user's needs and preferences in a specific narrow domain. Computerized algorithms can search and determine an optimal path to conduct and plan conversations towards the goal of teaching the user a new skill. In other words, to reduce friction in content discovery and to expedite the process of understanding a consumer's intent, a domain expert can play a positive and augmenting role. Domain specific coaches and agents cart also help with teaching and showing users how to get to their desired product/content more efficiently, after their intent is understood. With recent advances in AI and NLP in particular, autonomous coaches can be used to further automate and scale content discovery, conversation planning and coaching processes.

SUMMARY

In one aspect, a computerized method useful for, with an ensemble of Natural Language Understanding and Processing methods that convert a set of user actions into machine queries. This includes the step of providing a knowledge model. The method includes the step of receiving a natural language use query. The method preprocesses the natural language user query for further processing as a preprocessed user query. The preprocessing includes the step of chunking a set of sentences of the natural language user query into a set of smaller sentences and retaining the references between chunks of the set of sentences.

With the preprocessed user query and for each chunk of the chunked preprocessed user query, the method implements the following steps. Using a Name Entity Recognition (NER) ensemble, the method extracts a domain specific name entity from the chunked preprocessed user query. The method uses a sentiment analysis technique to determine a sentiment of each chunk of the chunked preprocessed user query. The method uses a classification technique for topic modeling of each chunk of the chunked preprocessed user query. The method appends each sequential chunk to a previously analyzed chunk. The method translates each chunk to a standalone system query and a contextual system query. To translate user query to a system query, the system can use a combination of different NLP functions, including but not limited to NER, sentiment analysis, part of speech tagging, canonicalization, classification, translation etc. The method queries the knowledge model using the standalone system query and the contextual system query of each chunk to determine a closest state in the knowledge model. The method returns a set of qualified decisions from the knowledge model that match the standalone system query and the contextual system query. Each qualified decision is scored. The method ranks the set of qualified decisions based on the score of each qualified decision. The method detects a winner state in the knowledge model as a highest ranked member of the set of qualified decisions.

BRIEF DESCRIPTION OF THE DRAWINGS

The present application cars be best understood by reference to the following description taken in conjunction with the accompanying figures, in which like parts may be referred to by like numerals.

Figure 1:
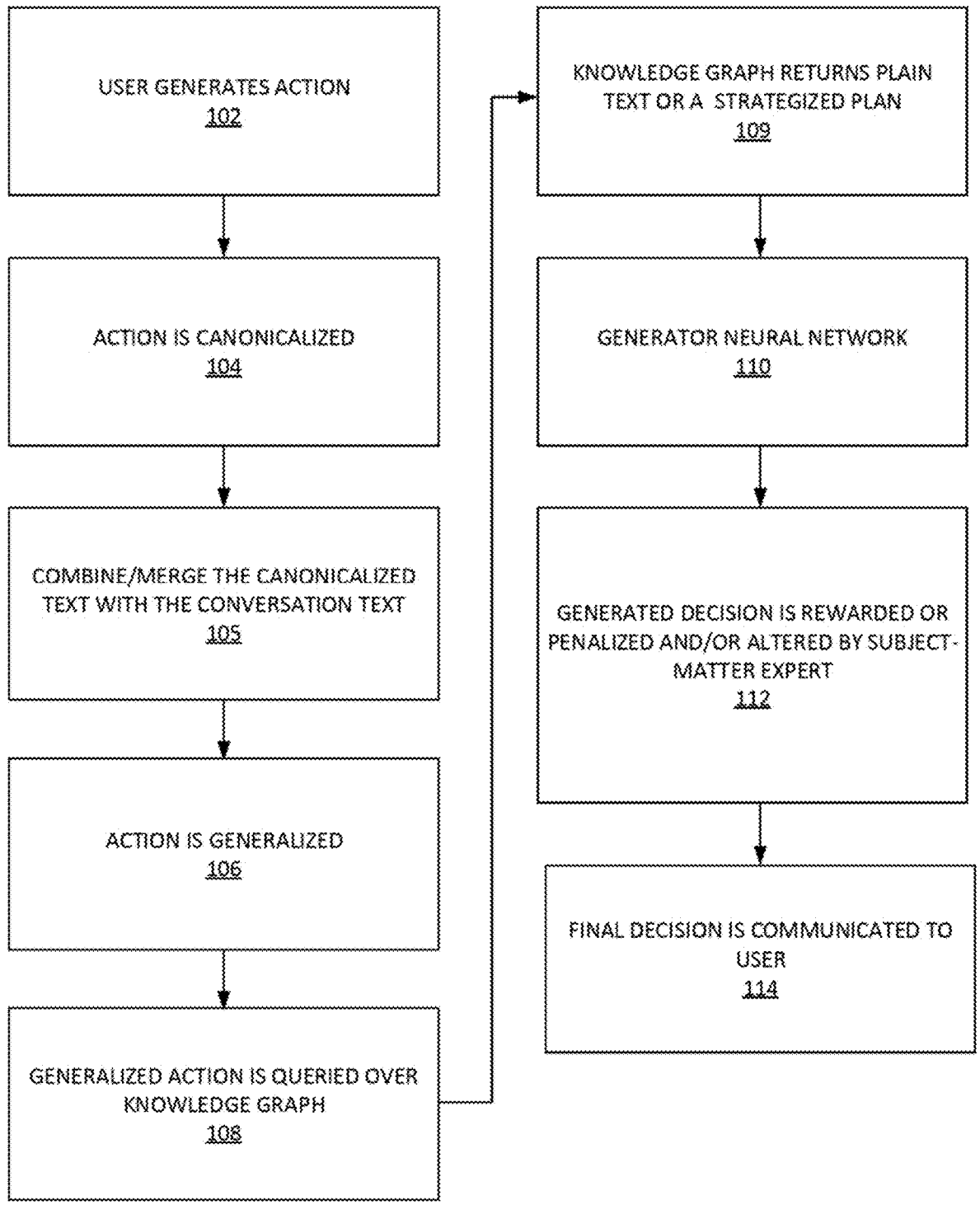
FIG. 1 depicts a flow diagram of an example process of a conversational-search engine, according to some embodiments.

The Figures described above are a representative set and are not an exhaustive with respect to embodying the invention.

DESCRIPTION

Disclosed are a system, method, and article of manufacture of a convolutional state modeling for planning natural language conversations. Although the present embodiments have been described with reference to specific example embodiments, it can be evident that various modifications and changes may be made to these embodiments without departing from the broader spirit and scope of the particular example embodiment.

References throughout this specification to "one embodiment," "an embodiment," or, similar language mean that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize however, that the invention may be practiced without one or more of the specific details, or with other methods, components, materials, and so forth in other instances, well-known structures, materials or operations are not shown described ire detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or ore taps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Exemplary Definitions

401(k) plan can be a tax-qualified, defined-contribution pension account defined in subsection 401(k) of the Internal Revenue Code.

Action (e.g. a query) refers to an input from user to the system. Users generate actions. User actions are translated to a tensor or set of variables. This standalone tensor or set of variables is a known state in the space model. This vector or set of variables in addition to the active conversation contexts can be mapped to known states in the space model using a distance calculation technique, or a vector similarity technique, such as an extended form of cosine similarity. The translated action can be a member and a subset of the known space model:

$$\text{Translated Action} \in \text{Space Model}$$

$$\text{Translated Action} = \{\text{var}_\alpha, \text{var}_\beta, \ldots,\} = S_\gamma$$

$$\text{Context} = \sum_{i=\text{first observed state}}^{\text{last occured state}} S_i$$

Canonicalization can be a process for converting data that has more than one possible representation into a standard, normal or canonical form.

Decision/Target state/Response can refer to an output rendered by the system in return to an input action. Decisions are produced by multiple components. Decisions are made by the system. A decision can be referred to a set of variables/tensors with particular values that are a result of applying a user generated input to a certain state in the system. This results in a new state that is called a target state or decision. A decision can manifest it to a user in form of text, video, image, sound or a combination of such content types on different devices. The rendered decision can be looked up using retrieval techniques or generalized/synthesized using generative methods.

Convolutional operations can include, inter alia: set addition, subtraction, intersection, quality and other functions that can be overloaded in a convolutional model. They operate as exact match on tensors and parameters, as well as, cosine similarity in n dimensional space. For example, two tensors are convolutionally equal if they are an exact match or if they have a cosine similarity that is close to one. The threshold can be trained and learned based on available tensors and data. The same can also be applicable to convoluted intersections. Two sets intersect if they have exact matches or if there are tensors with near one cosine similarity. The operations can be provided herein are convolutional unless explicitly stated otherwise. In some equations there, is a superscript asterisk to emphasize the convolutional overloading. If the asterisk is not explicitly given, still such an operation is considered as convolutional unless explicitly stated otherwise.

State is now discussed. A certain set of variable h particular values/vectors that can be re-produced by applying certain inputs/actions to a previous set of variables with particular values is called a state. A state can have two consumers: a computer system and a human. To the computer system, a state can be represented by a tensor or a set of variables (e.g. such variables can be represented by tensors depending on the inherent machine learning methods, used).

$$S = \begin{bmatrix} 0.34 & \ldots & 0.15 \\ \vdots & \ddots & \vdots \\ 0.56 & \ldots & 0.21 \end{bmatrix} \vee S = \{\text{variable}_o, \ldots, \text{variable}_n\}$$

Equation 1—State is a Tensor or Set of One to Many Variables

To humans a state can be represented by one to many knowledge nodes. A knowledge node is a human representable text, video, image, or document.

Basic State/Node can include, inter alia: a basic or atomic state that is not broken down into sub states because it simply does not make sense, or its further dissection does not justify the investment depending on the restrictions or preferences of the use case or domain. For example, in a use case "401k" can be considered as a basic state, but in another use case, one might want to break it into two more sub states like "pension plan", "retirement savings". Atomic/basic states can have dependencies, knowledge assets and relationships to other states. A basic or atomic state does not have any sub-states, but it can become part of many hyper states.

$$\forall S \subset S_{atomic} \Rightarrow S = S_{atomic} \vee S = \emptyset$$

Equation 2—Atomic States Have No Sub-States

Hyper state/node or convolutional state can be when two or more states are combined, and hyper or convolutional state is created. For example, "401k projections" is a hyper state. Hyper states inherit the dependencies and knowledge assets of the sub states.

$$S_\alpha + {}^*S_\beta = {}^*S_\gamma$$

$$S_\gamma - {}^*S_\alpha = {}^*S_\beta$$

Equation 3—States Can be Added and Subtracted $$\forall S_{hyper}: \exists S_\alpha, S_\beta \text{ so that } (S_\alpha \cap {}^*S_\beta = \emptyset) \wedge (S_\alpha \subset S_{hyper} \wedge S_\beta \subset S_{hyper})$$

Equation 4—Hyper States are Composed by Two or More States $$\text{if } S_\alpha \subset S_\beta \wedge \text{dependency}_i \in S_\alpha \Rightarrow \text{dependency}_i \in S_\beta$$

Equation 5—Hyper States Inherit All Variables and Dependencies of the Sub States Variable is a atomic peace of information/intelligence provided by the user and collected or recognized by the system.

Dependency is an atomic variable which is acquired and observed so the state or states which encapsulate this variable can become relevant to the context of the conversation. A dependency is a state variable that informs the system to proactively collect a value from the user.

Distance between two states can be measured by a number of different variables between the two. This difference can be fulfilled by one or a plurality of combinations of other states. For example, in a conversation the distance between a greeting state and a product purchase state an be bridged by a plurality of different paths, each path can be a composition of a variety of states.

$$\text{distance }(S_\alpha, S_\beta) = \Delta(S_\alpha, S_\beta) = {}^*S_\alpha - {}^*S_\beta \in {}^* \{(S_\theta + {}^*S_\theta + {}^*S_\lambda), (S_\gamma + {}^*S_\varepsilon), \dots\}$$

Equation 6—Distance of Two States Can be Measured by Number of States Which Can Cover the Delta of Variables Space Model (e.g. a conversation planning space model) can be a collection of discrete states modelled by inherent variables and dependencies. The space model can contain multiple entry states or zero states and a plurality of terminal or offer states.

Active conversation=$\{S_\alpha, S_\beta, \dots\}$ (without a terminal state)

Active conversation $\subseteq$: Context

Space Model=All known states in the system $\Sigma$active conversations$\subseteq$Context$\subseteq$Space Model Equation 7—Space Model Definition Offer state can be a terminal or destination state. For example, reaching, a checkout state in an ecommerce conversation can be deemed as a terminal state.

Conversation context is a collection of previous states and their inherent variables from state zero to now. It can be represented as a set of variables/tensors with particular values aggregated, acquired, inferred and deduced from the beginning of a conversation with a user.

Conversation Planning can be a function of guiding a conversation from a starting state to a terminal state. Conversation planning is a stochastic, multi-agent, sequential, discrete, partially observable and dynamic process. The process can, at times, be episodic when the system has the answer to questions which do not change the current state of the conversation. The planning function can be done via a plurality of techniques such as, inter alia; extended variations of Partially Observable Markov Decision Process, extended forms of Bayesian inferencing A* planning or a hybrid of such methods, etc. An aspect of planning can include finding a most probable terminal state based on the partially observed states. To find the highest probable state given the context of the conversation of observed dependencies, a plurality of techniques can be used including but not limited to extended variations of Partially Observable Markov Decision Process, or extended forms of Bayesian Inferencing, A* planning or a hybrid of such methods.

For example, if a consumer looks up information about blurry vision, and later the same user looks up information about itchy skin, the observed "blurry vision" and "itchy skin" dependencies can produce a substantial probability to attribute these symptoms to diabetes. This attribution can be done by different planning methods. Also, to verify this inference, the planning process can strategize or plan a path to ask/acquire/observe more dependencies to reject or verify the accuracy of this inferencing. The information collection path is another aspect of planning. In case of both rejection and approval, the system can passively learn from its observation.

Translated Action+* Active Conversation$_i$ $\in$ Space Model

Winner State=min(dist(Translated Action+*Active Conversation$_i$, Space Model))

Winner State=max((Translated Action+* Active Conversation$_j$)$\cap$*Space Model)

Equation 9—Conversation Planning and Searching the Winner State Using the Greatest Number of Common Sub States Knowledge Model can be a model that represents knowledge in form of states in a Vector Space Model represented by tensors or set of vectors or variables. In other words, the knowledge model is a domain specific space model containing the possible states to which the system is supposed to react and respond within that particular domain in which the system is implemented. The possible states that the system knows, can predict (and/or can react to) are encoded, stored in the knowledge model. Inferred States (aka. Decisions) can be represented differently, on different devices during content delivery, but the inherent inferred state (aka. Decision) remains the same. The knowledge graph describes the flow of conversations between states within the knowledge model. A knowledge model is a collection of possible states the system knows and can react to.

Natural language understanding (NLU) is a subtopic of natural language processing in artificial intelligence that deals with machine-reading comprehension. The NLU component is responsible for mapping user inputs to patterns that the system understands and can react to. The NLU component can use different techniques to it implement this (e.g. extracting entities from user inputs, chunking and classifying smaller pieces, determining sentiments, translating summarizing, canonicalizing sentences, etc.) in order to map user inputs to states in the knowledge model.

Dialog manager can track of active and unfinished conversations of each user spanning in current and the previous sessions.

Conversation graph can be a log of actual interactions between the users, the system and the resulted states. A conversation can be a sequence of states. A conversation between one user and the system can be a sub graph in the larger conversations graph. The user generated actions (and its generalized version), and the system made decision can be stored in the conversation graph as nodes. An action generalization can reduce entropy in the graph, as well as, also increase likelihood of multiple conversations sharing nodes.

Contextual System Query can be a tensor or a vectors or a set of variables used to query the knowledge model in the vector space model. The query is built by adding the context vector or set of variables to the latest processed user input action. The built query tensor or set of variables then queried over the knowledge model in order to find the closest state.

$$\text{Response State}=\max((\text{Translated Action}+*\text{Current Context})\cap *\text{Space Model})$$

Equation 10—Querying the Knowledge Model Using the Contextual System Query

Convoluted knowledge model can store a set of system states. The states can be atomic or hybrid. The states are represented by tensors or set of variables in a vector space model. It is noted that building complex states using other atomic or convoluted states allows the system to model various, possible permutations and combinations of sub-states and their permutations. The convolutional state model enables the system to match a permutation set of states with a hybrid state in the knowledge model, in case there is significance in the sequences. For example, in the pizza ordering domain, the state of adding extra cheese and the state of thin crust can be shuffled and all permutations can be mapped to one single hyper state in the knowledge model. The convoluted knowledge model can also store sequence-based states where sequence if the sub-states matter. In other words, in case sequence of user generated action matters there can be corresponding sequence-based states in the knowledge model. This design has better scalability compared to decision trees, decision support system, dialog-based conversations, and knowledge graphs. This design does not produce branches in a tree-like structure. Instead, it produces a set of sets than can include one another. These sets can be mapped to graphs for nearest search and planning purposes.

Dynamic Memory Network (DMN) can be a neural network architecture which processes input sequences and questions, forms episodic memories, and generates relevant answers. Questions can trigger an iterative attention process which allows the model to condition its attention on the inputs and the result of previous iterations. These results are then reasoned over in a hierarchical recurrent sequence model to generate answers. The DMN can be trained end-to-end and obtain results on several types of tasks and datasets.

Knowledge graph (e.g. an ontology) can formalize naming and definition of the types, properties, and interrelationships of the entities that really or fundamentally exist for a particular domain of discourse. The convolutional state model can be represented in form of a graph as well. This conversion is useful for distance calculation.

Generative adversarial networks (GAN) are a branch of unsupervised machine learning, implemented by a system of two neural networks competing against each other in a zero-sum game framework.

Individual retirement account (IRA) is a form of individual, retirement plan provided by many financial institutions, that provides tax advantages for retirement savings in the United States. An IRA can be described in IRS Publication 590.

Named-entity recognition (NER) is a subtask of information extraction that seeks to locate and classify named entities in text into pre-defined categories such as the names of persons, organizations, locations, expressions of times, quantities, monetary values, percentages, etc.

Neural networks are a computational approach, which is based on a large collection of neural units (e.g. artificial neurons), loosely modeling the way a biological brain solves problems with large clusters of biological neurons connected by axons. Each neural unit can be connected with neural units, and links can be enforcing or inhibitory in their effect on the activation state of connected neural units. Each individual neural unit may have a summation function which combines the values of its inputs together. There can be a threshold function and/or limiting function on each connection and on the unit itself (such that the signal surpasses the limit before propagating to other neurons). These systems can be self-learning and trained, rather than explicitly programmed, and excel in areas where the solution or feature detection is difficult to express in a traditional computer program.

Perplexity can be a measurement of how well a probability distribution or probability model predicts a sample. It can be used to compare probability models. A low perplexity indicates the probability distribution is good at predicting the sample.

Product graph can contain products of interest in a specified domain (e.g. financial services, retail, fitness) and their corresponding attributes. Each product in this graph can be specified by a sub graph of nodes. Each node can be product attribute feature or specification.

Roth IRA (Individual Retirement Arrangement) a retirement plan under US law that is generally not taxed, provided certain conditions are met.

Sentiment analysis can refer to the use of natural language processing, text analysis, computational linguistics, and biometrics to systematically identify, extract, quantify, and study affective states and subjective information.

Subject-matter expert (SME) can be a person who is an authority in a particular area or topic. An SME can have special knowledge or skills in a particular area of endeavor.

Vector space model (VSM) is an algebraic model for representing objects (e.g. conversations, text documents, etc.) as vectors of identifiers, such as, for example, index terms. A VSM can be used in information filtering, information retrieval, indexing and relevancy rankings.

Word embedding can be a set of language modeling and feature learning techniques in natural language processing (NLP) where words and/or phrases from a vocabulary are mapped to vectors of real numbers. Word embedding can include mathematical embedding from a space with one dimension-per-word to a continuous vector space with much lower dimension. Methods to generate this mapping can include neural networks, dimensionality reduction on the word co-occurrence matrix, probabilistic models, and explicit representation in terms of the context in which words appear.

Convolutional Neural Network (CNN) is comprised of one or more convolutional layers (often with a subsampling step) and then followed by one or more fully connected layers as in a standard multilayer neural network. The architecture of a CNN is designed to take advantage of the 2D structure of an input image (or other 2D input such as a speech signal)

Long short-term memory (LSTM) units (or blocks) are a building unit for layers of a recurrent neural network (RNN). An RNN composed of LSTM units is often called an LSTM network. A common LSTM unit is composed of a cell, an input gate, an output gate and a forget gate. The cell is responsible for "remembering" values over arbitrary time intervals; hence the word "memory" in LSTM. Each of the three gates can be thought of as a "conventional" artificial neuron, as in a multi-layer (or feedforward) neural network: that is, they compute an activation (using an activation function) of a weighted sum. Intuitively, they can be thought as regulators of the flow of values that goes through the connections of the LSTM; hence the denotation "gate". There are connections between these gates and the cell.

Seq2Seq: The encoder-decoder architecture for recurrent neural networks is the standard neural machine translation method that rivals and, in some cases, outperforms classical statistical machine translation methods.

Exemplary Processes

Example embodiment a conversational-search engine are provided. In one example, a conversational-search engine can be implemented in specified domains (e.g. parenting, health care, financial domain, education domain, travel-planning domain, etc.). For example, a user can provide a series of financial-related actions/queries to the conversational-search engine. The conversational-search engine can pre-process said actions/queries (e.g. canonicalize, generalize, summarize, etc.). The system planting the conversational-search engine can generate and/or maintain a set of graphs embedded within a knowledge model. Each graph shows a logical path between states and nodes in the knowledge model. This set of graphs can include a conversational graph a knowledge graph, a product graph, etc. This set of graphs can be used to generate a response to the user's action/query. The response to the user's action/query can be converted to a colloquial state for presentation to the user.

The conversational-search engine can generate and ask follow-up questions to the user. For example, the conversational-search engine can review a user's recent search history to plan a future decision/response for user. A future decision/response can be a product or service that is offered to the user. For example, the future decision/response can be a specified financial offering to the user (e.g. a 401K product, an IRA product, a student-loan repayment strategy, specific financial advice, etc.).

When a conversation is initiated, the conversational-search engine can, based on the context of the conversation, calculate a distance (e.g. as represented by a graph of various action/response node) before it can render the news state which can include an offer or product/service to the user. Distance can be a function of how many product parameters/attributes are to be determined until the goal state is offered to the user.

The state model graph is heuristically admissible. For example, take 401k calculations as product, to calculate projection of 401k distribution ten (10) years after retirement, the product graph can have dependencies/variables (e.g. current 401k savings, retirement age, etc.) which are to be acquired/fulfilled before the system can calculate the 401k projection. As an example, if the system has to fulfill N dependencies or parameters before a calculation can be done, before a product can be searched, or before a request can be invoked, then the distance between current state to the fulfillment state is N hops. For example, N (the number of parameters to be acquired) is the number of hops between the generated action by the user and a terminal state in the knowledge mode. Based on the context of the conversation and the domain-level variables already acquired for the current user (e.g. historically and during the current session), the system can calculate distance of current state of the conversation to all possible products in the product graph. Once the distance is calculated, a strategy (e.g. a sequence of questions) is planned to proactively guide the conversation towards the nearest product.

A contextual-system query-scoring model is now discussed. The scoring model can be based on cosine similarity and soft cosine similarity distance between the contextual system query and knowledge model states. The best match can be the greatest number returned by the before mentioned methods using the two tensors or two sets of variables.

Scoring model using Cosine Similarity and Soft Cosine Similarity Between Contextual System Query and Knowledge Model (i.e. a Space Model) states $$Score = \frac{\sum_{j=1}^{n} (\text{Contextual System Query})_i (\text{Knowledge Model State})_i}{\sqrt{\sum_{j=1}^{n} (\text{Contextual System Query})_i^2} \sqrt{\sum_{i=0}^{n} (\text{Knowledge Model State})_i^2}}$$

Equation 11

A decision-tie breaker can be used to return one winning decision from multiple qualified decisions with the same initial scores. Decision-tie breakers can utilize multiple techniques serial or parallel. The first method is by increasing precision of the cosine similarity and soft cosine similarity it f distance explained in the scoring model, if there are still multiple states producing identical distances or cores in the vector-space model, then the subsequent tie breaker techniques can kick in. It is noted that in occurrence of such cases, the attention model can also be used to ensure that less important tensors or variables are given lower scores and more important ones are given more weights.

The next tie breaker mechanism is based on the least number of unfilled sub-states for the qualified states. If there are multiple winning states with the same number of common sub states, the one which is closest to a terminal, or has the least number of unfulfilled states is the eventual winner.

In addition to his technique the following techniques can be used in conjunction with the least number of unsatisfied sub states method. The backup techniques can include an attention model. The attention model gives weight to certain previous states in the conversation. The attention model is a vector which multiplies less important states with close to zero numbers and more important states with number closer to one. This vector can be learned using machine learning techniques. Also, the attention model vector can have preset values. Another technique used for breaking ties is temporality of variables and sub states acquired. For example, certain observations or acquired dependencies might be good to answer an episodic or stateless question, and therefore their lifetime will not last more than span of a question and answer. On the other hand, there are observations and induced states that would last much longer. The eternal observations will not die out, but ephemeral observations are good only for one query.

Tie breaking formula using convolutional intersection if count (win state) >

$$1 => \text{win state} = \text{tie breaker (win states)}$$

$$\text{distance} = \sum_{i=last\ state}^{first\ state} (\text{attention vector} * S_i)$$

tie break winner = min(distance ∧ count of unfilfilled substates)

for all win states

Equation 12

A conversational-search engine can implement responses using various deep-learning methodologies, by looking up pre-curated content. For example, conversational-search engine can utilize a plurality of artificial intelligence and machine learning algorithms to implement responses. Once the system determines the new state of the system after a user action is processed, the system can map the new state to a pre-curated content (information retrieval methods) or use machine learning techniques to decode the new state to text, video, image or a combination of all (e.g. with generative methods).

In some example embodiments, conversational-search engine can use various types of graphs or models, including, inter alia: a knowledge model, conversation graph, a knowledge graph and/or a product graph. A conversation model is a collection of the possible state the system knows and can react to. A conversation graph can be log of a conversation previously seen by the conversational-search engine. The conversation graph a include actual and generalized actions and generated decisions by the conversational-search engine.

During span of each conversation product graph is used to determine which products are relevant o the context of the conversation and what the future decisions are to appear as. Also, the product graph can explain how a product can be qualified to be offered. In other words, a product graph which is a subset of the knowledge model, defines the dependencies which have to be observed before the terminal/offer state for the product can be fulfilled/reached. The product graph can be used to build a strategy as how to acquire all necessary attributes and dependencies from the user, so a product can be offered to the user. Knowledge graph can include the entities in the specified domain and their relationship to each other. Knowledge graph is also a subset of the knowledge model. Knowledge model and its states can be represented intra a graph, which is called knowledge graph. This conversation can be used to perform conventional graph functions, like shortest path, etc. Relationships can be defined based on, inter alia: similarity, difference, compatibility, usability, etc. For example, in financial services domain, the "401k" entity node is connected to the "IRA" node through multiple edges, one edge can be similarity, the other edge be difference, another edge can be fund-transfer. Another example in fitness domain an be relationship of "weighted pushup" entity to "bench press" entity. The similarity can be inferred based on the underlying sub states that the hyper states inherit. There can be an edge connecting these entities explaining how these two entities are similar. A next edge can explain how these two are different. Another edge can explain how these two can be combined in a workout cycle. Again, the difference can be derived by comparing the sub-states which are exclusively inherited by each of these hyper states.

Another example in the food vertical can be relationships between "Chicken Schnitzel" and "Chicken Ravioli". The knowledge graph can, be pre-curated. In the domain specific knowledge model, there are two sets of entities: basic entities/states and hyper entities/states. Hyper states/entities are entities which encompass two or more entities, basic or hyper. For example, in the diet vertical the node "diet" is a basic entity, the node "low carb" is also a basic entity. The node "diet" has its own knowledge or information data, and sample media assets associated to it. For example, if user asked, "what is diet?", the system can fetch the sample information/knowledge associated to the node "diet" from the system as the response. The node "low carb" also has associated knowledge, media assets (like sample images, videos, etc.) associated to it. The hyper node "Low Garb Diet" is a new node/state composed of the two basic nodes/states "diet" and "low carb". This hyper node inherits the content, knowledge and media assets of the enclosing assets, in addition to its own unique assets and knowledge/information content. For example, to answer "what is low carb diet" the system can fetch the knowledge associated directly to the hyper node. Each knowledge model node contains the following items:

a list of sub entities (e.g. a basic node has no sub entities, and a hyper node has least two or more sub entities); and a list of direct dependencies (e.g. a dependency is a piece of data which has to be collected from the user or inferred by invoking an API before the system return the knowledge item associated to this state/node). Hyper-states/nodes can inherit sub dependencies. Accordingly, in order to get to the knowledge item of a hyper node, the immediate dependencies associated to the hyper node as well as the dependencies associated to the sub entities must be acquired and fulfilled. For example, to calculate 401k distribution projection five (5) years after retirement, all the dependencies inherited from the sub entities and the immediate dependencies of the hyper node "401 distribution calculator" are to be fulfilled and acquired. Sample dependencies can be "age", "base salary" and "annual raise percentage", etc. To acquire and fulfill dependencies the system can strategize and generate a series of questions. It is noted that the list of dependencies is also referred to a product graph.

The list of media assets can be an optional list. A media asset can be a picture, a video, or an audio file. The media asset list is used to represent additional information about a node. The list of assets can be displayed when the dependencies of the node are fulfilled.

The list of knowledge items is now discussed. A knowledge item is a generalized piece of text. Knowledge items may not be served to user until all the dependencies of the node are acquired. The system can show one or a plurality of the knowledge items associated to a state/node. The system can choose to contextualize the general knowledge items associated to nodes during runtime. The base knowledge item can be further generalized while delivery, to show a more personalized text, or even generate/select an image, a video or a combination thereof.

The named-entity recognition (NER) is a subtask of information extraction that seeks to locate and classify named entities in text into pre-defined categories such as, inter alia: the names of persons, organizations, locations, expressions of times, quantities, monetary values, percentages, etc.

Classification can be used to categorize a sentence or user action. A user action cat be categorized to one or multiple classes or categories. For example, "Hello" can be categorized as "Greeting" and "yes" can be categorized as "Affirmation". The classes obtained can be used as additional data to better assist mapping user actions to states within the knowledge model and produce a more reliable and transparent mapping. Another example can be, "After using the lotion my itching got worse" can be categorized to "condition deteriorated" and "used prescription". To determine classes of user actions different architectures and techniques can be used.

Sentiment analysis can be used to determine sentiment of a user action. For example, "My interest rate is high" in financial services domain has a negative sentiment. Another example "Very rarely" can produce a negative sentiment depending on existing context in response to which user have produce such action. The sentiment of each user action produces useful data points which can be used as additional data to better assist mapping user actions to states within the knowledge model and produce a more reliable and transparent mapping. Different various machine learning (ML) techniques and architectures can be used for sentiment analysis of user actions.

A standalone system query can be a translated query using provided data by user without using contextual data. It can be assumed that the system is stateless and then the user query is translated into a system query. This standalone system query can produce a qualified state the knowledge model. This score can be compared with result of contextual system query and then winner can be chosen. This mechanism helps the system whether the latest user action is following the existing context or conversations or is starting a new one or is a stateless action.

FIG. 1 depicts a flow diagram of an example process 100 of a conversational search engine, according to some embodiments. In step 102 of process 100, a generates an action. An action can be a user query and/or other request for information about a product or service. In step 104 of process 100, action is canonicalized. For example, the user query can be modified into a standardized/canonical form. For example, user action can be "Kan I conbute to mltpl 401s". The canonicalized version can be "Can I contribute to multiple 401(k) accounts?".

In step 105, the canonicalized action is combined with the conversation context (e.g. previous states). In case the new action is a follow up question, this step generates a more detailed question. For example, user had asked about 401(k) previously and the canonicalized action is "What is the max". This step can produce a new canonicalized action like "What is the maximum 401(k) annual contribution".

In step 106, the action can be generalized. Generalization can include the summarization of different sentences to shorter versions. In one example of generalization/summarization the user action can be "Please compare 401k with Roth IRA", or "401k vs Roth IRA". Step 106 can convert this to a summarized/generalized form of "Find similarities between 401k and Roth IRA". In another example, the user action can be "my college loan interest rate is awful, what should I do?". Step 106 can translate this to a summarized/generalized form of "Find remedies to reduce college loan interest rate". Very long actions can be broken down into smaller pieces/chunks and then re-combined to for the original query. Each generalized chunk can map to a particular sub-state in the knowledge model. The new decision can be a hyper state encompassing such sub-states. For example, the finance vertical, if user's action is "I am planning to go back home to UK, I have been working in the us on an H1B visa, can I rollover my 401k savings to a pension plan in the UK", can be broken down to "I am planning to go back home to UK" "I have been working in the us on asp H1B, visa", "can I rollover my 401k to a savings plan in the UK". With respect to the financial services domain, some of the provided information can be discarded. Necessary information can be extracted using NER techniques. Each chunk represents a new state in the knowledge model. The broken-down statements can be further generalized and translated to a query for knowledge model like this "find 401k to UK-pension rollover".

An ensemble of different AI techniques can be used to perform the translation from natural query to knowledge model query. For example, a set of CNN, LSTM, or Seq2Seq techniques can be used to perform NER, and natural query to system query translation. The translated system query can be sent to the knowledge model to fetch a proper response.

In step 108, generalized action form of the user's action is queried over a knowledge model. An example knowledge model is provided infra in the description of FIG. 4. The translated system query can find the nearest node/state (e.g. a hyper node basic node). The system query can have zero to many variable in it. These variables can be matched with the states/node in the knowledge model. In addition to the query variables, existing fulfilled dependencies/variables in the context of the conversation can be used in the process of finding the best state/node match. For example if the translated query looks like "calculate BMI age 34", and if the context object holds a key value pair for weight (e.g. weight 168 lbs.), then the system can search/plan for a node/state that has the greatest number of matches to "calculate BMI", with "age" and "weight" dependencies fulfilled and the least number of unfulfilled dependencies. Also, this planning process can use extended variations of Partially Observable Markov Decision Process, or extended forms of Bayesian Inferencing, or a hybrid of such methods to find the most probable state available in the space model. In cases where more than one node/state is returned different tie-breaker policies an be used.

Two example tie-breaker methods are attention-tie-breaker and temporal-tie-breaker. An attention-tie-breaker gives more weight to certain dependencies learned from previous training. The dependencies with more weights qualify as the winner. The attention-tie-breaker weight vector can be learned through an ensemble of different AI techniques including, but not limited to, LSTM, and Seq2Seq. The temporal-tie-breaker gives more weight to more, recent, dependencies. An acquired dependency is tagged with a timestamp.

In step 109, the knowledge model can return plain text or a strategized plan. The strategized plan is produced from the list of aggregate unfulfilled dependencies associated immediately to a hyper or basic state (in case the node is hyper state, in addition to immediate dependencies, list of inherited dependencies from the internal entities embedded in that hyper states are also added to the strategized plan).

In step 110, the output decision of step 109 is fed to a generator neural network. The generator neural network can contextualize the text generated by the previous step. For example, this text "Important downside, under 50, max contribution is $17,000" can be contextualized as "An important downside is, since you are 34 and under 50, that you cannot contribute more than $17,000 a year to your 401(k) plan". Step 110 can render a colloquial and a more personalized text for users. Various personalization effects can be included into the output of step 110. The contextualization process can be done by using machine learning and artificial intelligence techniques including but not limited to LSTM, sequence 2 sequence and GAN.

In step 112, a generated decision can be rewarded or penalized and/or altered by a subject-matter expert. Rewards, penalties and changes are fed back to the system for further learning through reinforcement learning components. In step 114, a final decision is communicated to user.

Figure 2:
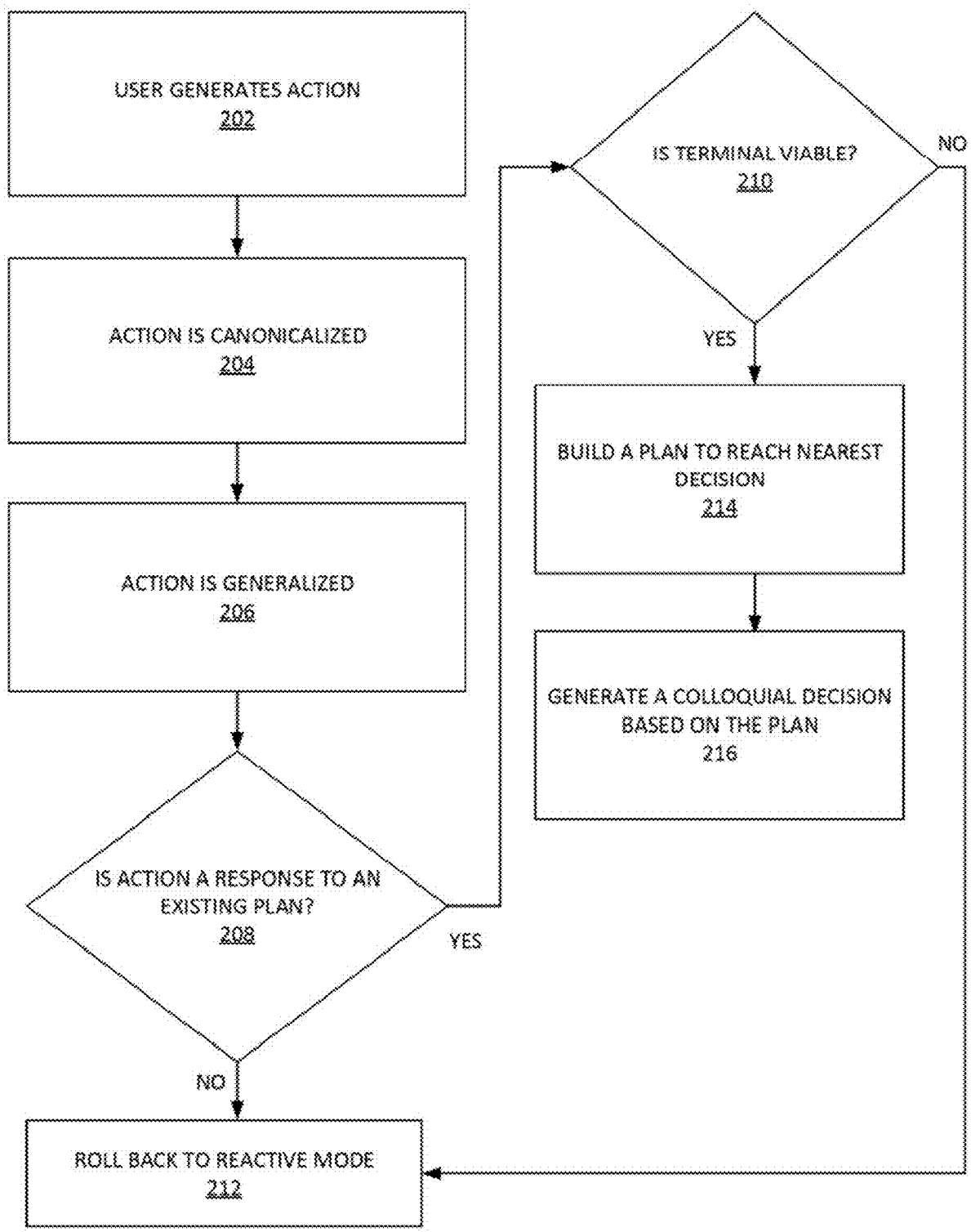
FIG. 2 depicts a flow diagram of another example process of a conversational-search engine, according to some embodiments.

FIG. 2 depicts a flow diagram of another example process 200 of a conversational-search engine according to some embodiments. In step 202, a user generates an action. In step 204, an action can be canonicalized. In the step, the canonicalized action is combined with the conversation context and previous states. This step helps to co bine the pattern recognition task of the user input with current state of the conversation to better map the system a target state. For example, if user had previously asked "Do I need to pay extra tax if I take a loan from my 401(k) accounts", and subsequently asks "What if I am 61".

The combined state is pushed to, step 206, where the latest aggregated state is generalized. The previous sequence can be generalized to "Find if should pay extra tax for 401(k) loan when age is more than 59.5". In step 208, it can be determined whether the action is a response to an existing plan. For example, in fitness and food vertical if user action is "I want to lose 40 lbs. for my wedding", the system maps this input to a state which can predict the user is asking for a weight loss product/program. Therefore, using the product graph (which is created from the list of outstanding dependencies associated to that node), the system can strategize a series of steps to guide the conversation to a weight loss program. The system can review the conversation context and user's history to collect and fulfill the variables required for a weight loss program, if possible. The remaining variables, if any, can be collected through a series of questions strategized in this step of the algorithm. In this state the system can proactively guide the conversation to eventually suggest a product or offering. The system can ask one question at a time. If the user action is in response to the asked question/decision (generated by the system) the system stays in proactive mode. In proactive mode the next step is 210. If 'no', then step 208 can roll back to reactive mode in step 212 for this interaction. However, the system can still ask if the user is still interested to continue the conversation for the offering/product which is still fresh in the context of the conversation. If user's action is in response to an existing plan, it can be determined whether the terminal node is viable in step 210. If then process 200 can proceed to step 212. In step 214, process 200 can build a plan to each nearest decision.

In step 216, process 200 can generate a colloquial decision based on the plan strategized. The raw output can be contextualized by following the algorithm specified in process 100 (of FIG. 1), step 110 onward. In proactive node the system can generate a decision to user stating that it acknowledges that it had received an action/response relevant to its decision/question, and can immediately ask the next question in the strategized sequence. A strategized sequence can be a sequence of questions planned to guide the current state of the conversation to a terminal/product/offering the product graph. For example, in order to offer 401(k) calculator a few questions can be asked before the system can show distribution projections (e.g. current age, current 401k balance, salary, etc.). Another example can be about weight loss, a strategized sequence of questions before a product can be offered can contain questions about current weight, age, gender, etc. If user's action is not in response to a question of a strategized plan, as explained previously, the system temporarily rolls back to reactive mode to (following process 100), to respond to user's question with proper colloquial decision/answer. Immediately after that the system can fall back to the proactive mode again to ask the unsatisfied question again.

For example, for weight loss the system asks "What are your favorite snacks?". If user responds with "How many calories are there in a Snickers bar?", the system can rollback to reactive mode, since user action is not in response to its question/decision. The system can answer "215 calories". Then the system can immediately return to proactive mode and it can ask the unsatisfied question/decision again. The question can be personalized and re-contextualized to look more natural and friendlier. For example, it can ask "Ok, let me ask again, do you have any favorite snacks?" alternatively it an ask "Besides chocolate, what other snacks do you like?". The component which tracks active conversations for one user in one or all sessions is called the dialog manager. The dialog manager uses existing sequence of conversation states (e.g. a conversation context), existing conversations and potential terminal states, and compares these with the latest generated query to determine which conversation has to be continued. The winning conversation is a winning state. To determine the winning state a tie-breaking step can be utilized as well.

Figure 3:
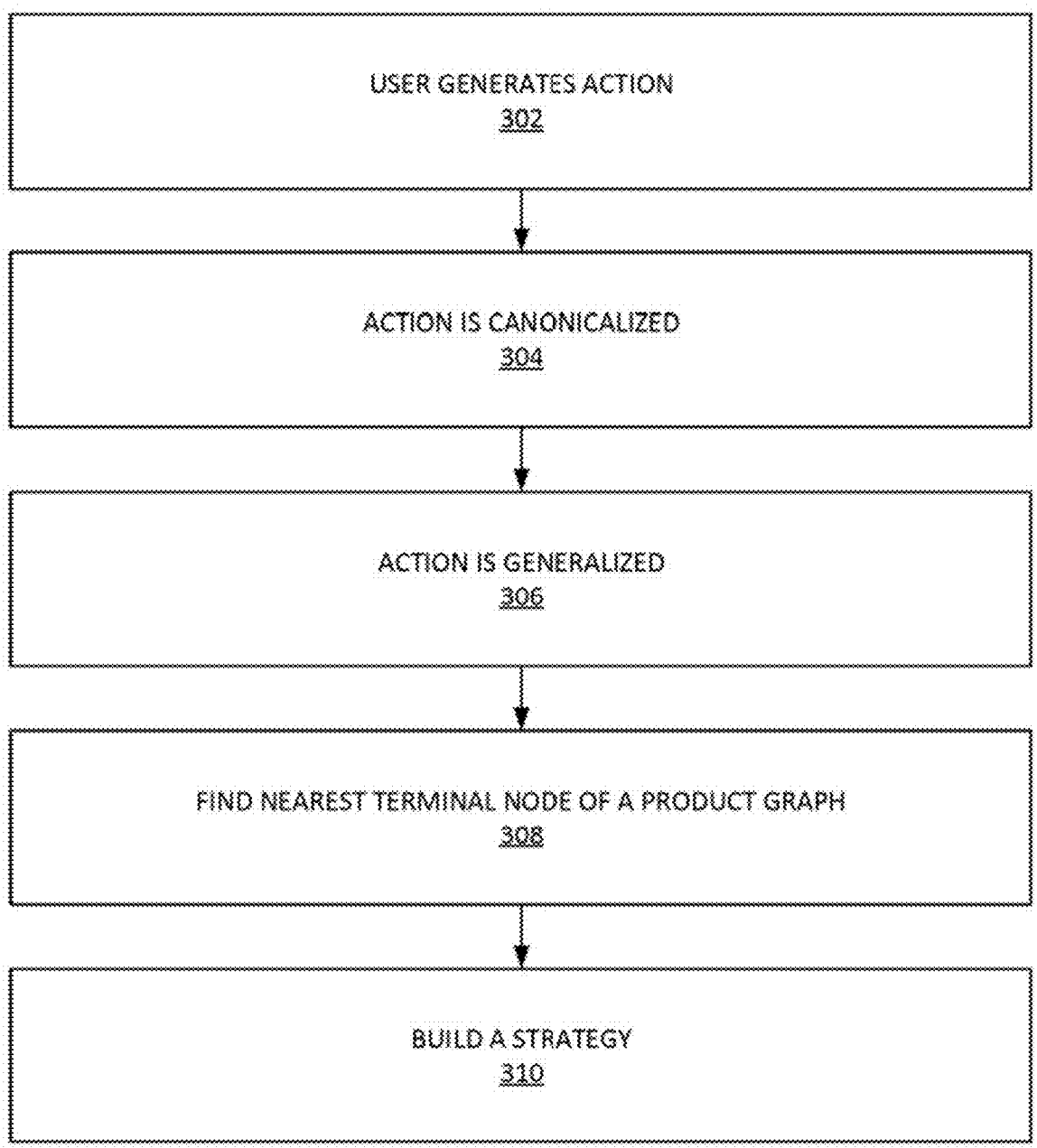
FIG. 3 depicts a flow diagram of yet another example process of a conversational-search engine, according to some embodiments.

FIG. 3 depicts a flow diagram of yet another example process of a conversational-search engine, process 300, according to some embodiments. In step 302, a user generates an action (e.g., in fitness vertical "How bout with a born ankle?"). In step 304, an action can be canonicalized (e.g. "How about with a broken ankle?"). In step 305 the canonicalized action be merged with the context of the conversation, if there is any prior context. The merge process can create a more detailed query. Existing conversation state can be represented as an encoded tensor, or a set of variables with particular values as a result of previous interactions. This tensor maps to a certain state (e.g. a hyper state) if the conversation has many states. The merge process can add the new processed input with this state to predict a new hybrid state. For example, if the prior context is about "best cycles to improve quad and calf muscles", the merged query can be "What is the best therapy and workout cycles to improve quad muscles with a broken ankle?".

Its step 306, an action can be generalized e.g. "find therapy for quad and broken ankle"). In step 307 the system query (e.g. generalized translated query) can be executed over the knowledge model. The knowledge model can return a decision/state or a pointer in the product graph. The pointer in the product graph provides the state of the conversation is ready to query about a product (e.g. the system knows that it should strategize a plan to fulfill variables for a therapy product for a broken ankle to strengthen quad muscles). In step 308, process 300 can find nearest terminal node of a product graph. A terminal node in the product graph can be reached when all variables for a product are satisfied. For example, the therapy program for broken ankle, can be reached once all the variables for this product are satisfied (e.g. for the therapy product to be fulfilled, the product graph can define age, gender, desired recovery period, profession, etc. as variables). Accordingly, the system can strategize a sequence of questions t acquire the variables one step at a time. At the same time the system can have multiple active plans to possible products/terminals. Step 308 can find the nearest terminal/product by measuring its distance from all viable terminals. The distance to a terminal is number of unsatisfied variables to each particular product. For example, the therapy product for broken ankle can have twelve (12) variables. Therefore, if none of these variables are already acquired, the distance to this terminal can be twelve (12). All the acquired variables from previous conversations and sessions can be stored in the context of the conversation. If in previous conversations user had stated that he is an amateur soccer player, and then the distance to the therapy product for broken ankle can be reduced to eleven (11) hops. The terminal node of a conversation graph can be a product/service to offer the user.

In step 310 process 300 can build a strategy to create a sequence of quest The strategy a be designed to proactively guide a conversation towards a terminal (e.g. a product and/or service, etc.). Process 300 can do this proactively. For example, during a conversation at any moment the system can gauge its distance from offerings (e.g. products) in the product graph. For example, any financial services system can offer hundreds to thousands of products/services. Each product/service can have its own attributes/parameters. For example a set parameters (e.g. ten (10) different parameters) can be obtained from a sequence of user actions before a product is offered. Process 300 can have obtained a set of three (3) of them from the user. Accordingly, seven (7) additional hops, with each hop being an attribute/parameter, of the product/service, until the terminal node is reached. Each parameter is a hop/dependency in the graph. User can cancel an already strategized plan by stating an action like "Stop it", "I do not like to know about this therapy". Alternatively, user can start asking about a different product at which point the old plan ca be paused and a new plan can be strategized for a new goal. The new plan can fulfill the new goal (e.g. product, offering, terminal).

Example Graphs

The following example models and graphs can be utilized by a conversational-search engine to implement processes 100-300.

Figure 4:
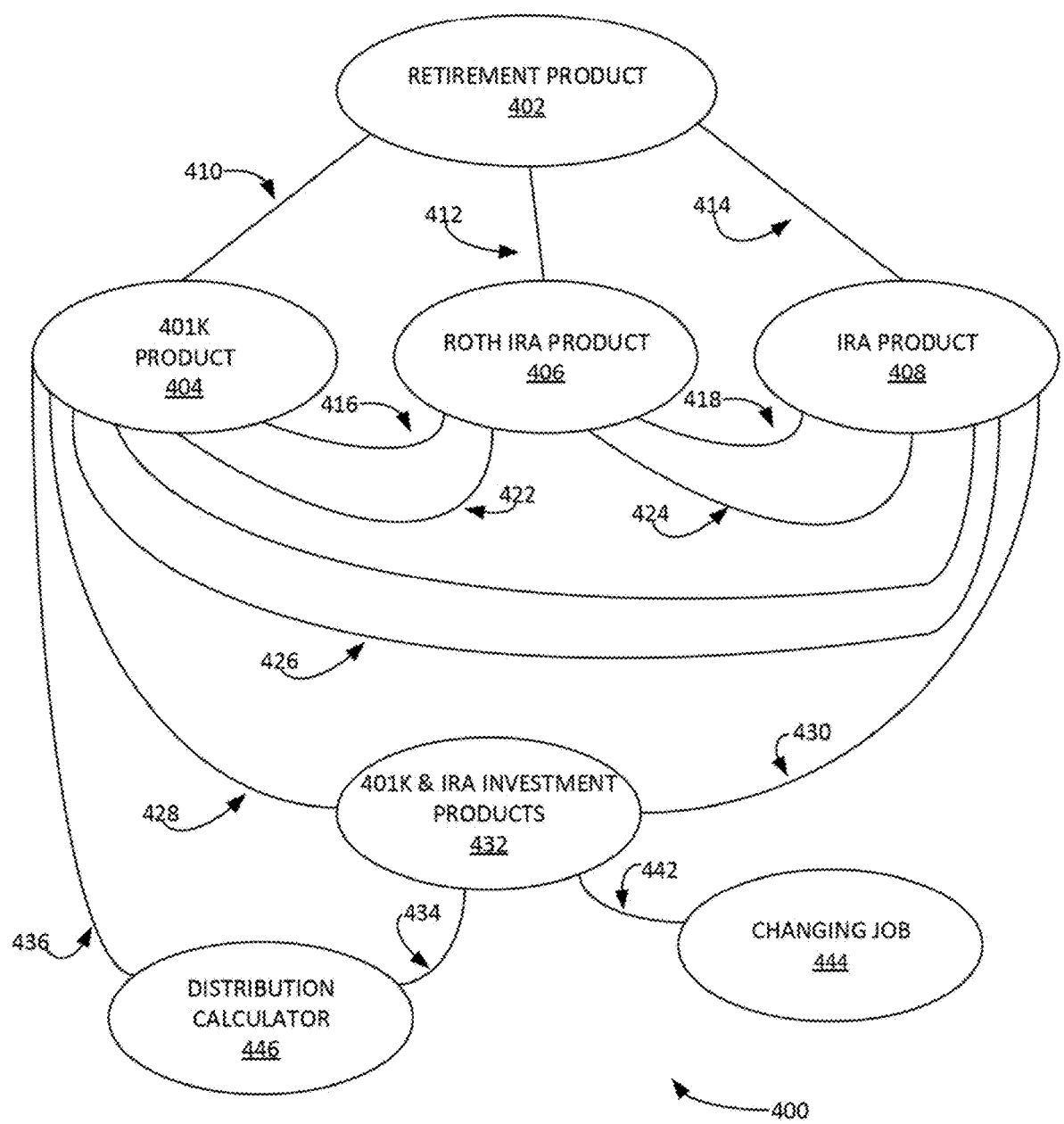
FIG. 4 illustrates an example knowledge graph, according to some embodiments.

FIG. 4 illustrates an example knowledge model 400, according to some embodiments. Knowledge model 400 can be heuristically admissible. Knowledge model 400 can comprises various states. A knowledge model is also hyper graph or convolutional graph and the relationship between states can be represented as edges between nodes. Each node can represent a basic state/entity (e.g. finance vertical basic entities can be 401k, IRA, Roth IRA, loans, bonds, distribution calculator, etc.). Also, nodes can be composite/hyper states/entities (e.g. in finance vertical composite entities can be "401k and IRA investment" 432). Each edge between the nodes can describe a particular relationship between the nodes. In finance a vertical these edges can be similarity, difference, compliance, to be part of, etc. Knowledge graph 400 can include a parent node 402. It is noted that in the present example, knowledge graph 400 can be for a set of retirement products. Accordingly, node 404-408 can represent retirement products, 432 is a composite node, "401k and IRA investments". Node 446 is "Distribution calculator", and node 444 is "changing job". In other examples, knowledge graph 400 can include information for other domains (e.g. travel planning, education planning, etc.). Knowledge graph 400 can be automatically generated by an induction module and/or manually curated by an SME. Alternatively, a DMN can create a different induction model by processing actual and generalized conversation graphs. The knowledge graph and DMN induction model can function in parallel. Using a normalized probability model, the best output can be used.

Parent node 402 can indicate that knowledge model (converted to a graph and represented as knowledge graph) 400 represents said retirements products. This relationship can be represented by edges 410-414. Edges 410-414 can define that nodes 404-408 are retirement products (e.g. 401k product 404, Roth IRA product 406, IRA product 408, etc.). Edges 416-420 can describe the similarities between the respective nodes that they are connecting. Edges 422-426 can describe the differences between the respective nodes that they are connecting. Edge 436-434 describe that the basic entity "401k" and the composite entity "401k & IRA investment" can use distribution calculator. Edge 442 describes the best action between nodes "Changing job" and "401k & IRA investment". In simple words, the edge 442 describes the best action a user can do if she/he has 401k and IRA accounts and is changing jobs. Edge 430 and 428 can describe that the nodes are part of each other (e.g. 401k is part of 401k and IRA investment funds). Each edge can contain plain text. For example, edge 416 can contain the text describing how 401k is similar to Roth IRA. Alternatively edge 422 an described how 401k is different from Roth IRA. If user's generation action is "tell me, how is 401 diffrnt from Roth IRA?" (not that misspelled words can be automatically auto corrected), this action is canonicalized to "How is 401k different from Roth IRA?" and then translated to "find difference for 401k and Roth IRA". This query can find edge 416. The plain text in this edge can be returned as the decision. This plain text can be later contextualized and personalized to look more colloquial. The colloquial text can be penalized, rewarded, or altered by an SME so the system can actively learn from it using reinforcement learning techniques. The final text be returned to user as the decision made by the system in response to her/his action. If user's action is "How much money can I spend 10 years after I retired if I am contributing to an IRA and 401k?", the system can generalize this query to "find distribution calculator for IRA and 401k?" (ten (10) years after retirement can be saved in the context of the conversation as fulfilled variable). This system query can return edge 434. This edge can contain a pointer to a product in the product graph instead of plain text only. The pointer to the product graph can help the system to strategize a plan to ask a sequence of questions to guide the conversation to fulfill the goal of finding annual distribution for 401k and IRA investments. Edges can contain plain text and/or point s to one or multiple products in the product graph. In case multiple products are returned, the system can strategize plan for the nearest terminal/product/offering/goal.

Figure 5:
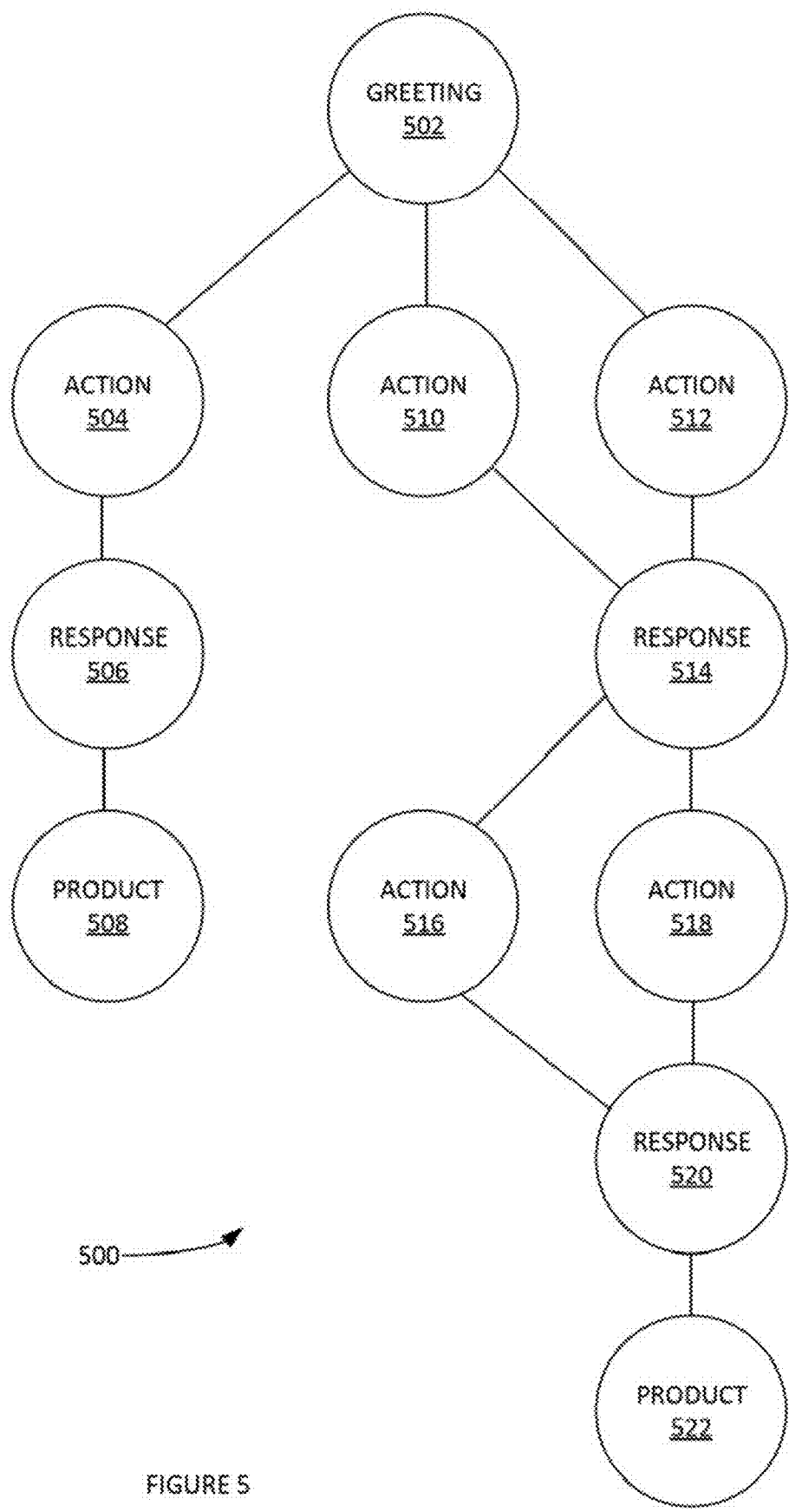
FIG. 5 illustrates an example conversation graph, according to some embodiments.

FIG. 5 illustrates an example conversation graph 500, according to some embodiments. There are two conversation graphs: an actual conversation graph and a generalized conversation graph. The actual conversation graph can contain the actions generated by all users and the final generated decisions by the system. The actual conversation graph can be used as an input to a DMN to create an induction network. Each node in the actual conversation graph represents an actual action generated by a user (e.g. "I need to drop 15 lbs. in 1 week"), or a final decision generated by the system (e.g. "That a bit aggressive, what is your weight?"), or it can be a product (e.g. "The order for this diet is placed, an email is sent to your inbox"). The generalized graph contains generalized actions and the raw decisions made by the system if a decision is penalized or altered by a SME, the correct version of that decision can be stored in the generalized conversation graph. The nodes in the generalized conversation graph can be generalized actions (e.g. "find 401k distribution calculator"), or a decision made by the system (e.g. "What is $USERS age?"), or it can be a product/offering/goal/terminal (e.g. "The appointment email is sent"). The number of overlapping nodes in generalized graph can be much higher than number of overlapping nodes in the actual conversation graph. Conversation graph 500 can illustrate e history of different prior conversation over a period of time (e.g. for a plurality of users). A conversational-search engine can utilize these conversations to learn from. Conversational search and planning engine can use the generalized and actual conversation graph for search and planning. As the conversation graph aggregates sore and more conversations the function of goal prediction of a conversation based on its early interactions can become more accurate. Conversation graph 500 can be a log of past actions and/or responses. Conversational-search engine can review the historical log and determine a similarity with later conversations. In this way, conversational-search engine can leverage this historical information in determining a more-informed current response to a user action.

Conversation graph 500 can initiate with a greeting 502. Greeting 502 can be implemented in a natural-language format. Greeting 502 can be colloquial. Greeting 502 can be personalized for the user.

Conversation graph 500 can include a series of states/nodes that terminate with a product offer. The series of nodes can alternate between user actions 504, 508, 510, 512, 516, 518 (e.g. a user node) and conversational-search engine responses 505, 514, 520 (e.g. a system node). An action can be a user input such as question related to the relevant domain response can be an answer, a query to the user for more information, etc. It is noted that, in some example embodiments, a product offer can include an offer for a service and/or various advice/information. Conversation graph 500 can be used to implement goal-based planning for a specific domain. The conversational search and planning engine can ease sequence 2 sequence deep learning techniques to translate low level system decisions, returned as a result of system queries over knowledge graph, to colloquial, personalized and contextualized decisions/answers/responses. This can happen in parallel to other machine learning and artificial intelligence techniques. The system generated decisions/responses/answers can further by inspected by SMEs. SMEs can reward, penalize and/or after system generated content. Such penalties, rewards, and changes can be fed back to future learning iterations. The conversational search and planning engine can use reinforcement learning techniques along with other machine learning and artificial intelligence techniques to learn from SME feedback.

As shown in FIG. 5, conversations can have overlapping states/nodes. For example, two conversations can share common user actions and/or conversational-search engine responses. For example, since conversations are represented as states, it is common for two conversations to share sub states. The conversational search and planning engine care use a generative adversarial network to convert system level responses to colloquial, contextualized and personalized sentences.

Conversation graph 500 can draw its response from a knowledge model (e.g. knowledge model 400, etc.). It is noted that conversational-search engine can answer questions (e.g. not elated to a product graph). Once one or more user actions are received, conversational-search engine can generate a plan towards a nearest product node. Conversational search and planning engine carp use machine learning and artificial intelligence techniques (e.g. deep learning sequence 2 sequence) to convert and/or summarize and/or generalize user generated actions to system level queries. The system level queries can be queried over a knowledge graph. For example, this user action "My college interest rate is awful, it is frustrating," can be translated to "find solution for high interest rate for college loan". A neural network can be applied to the user input to generate a system query. The system query a be applied over an applicable knowledge model. The knowledge model can return a raw system-level answer which is not yet ready to be dispatched to users. The conversational search and planning engine can use machine learning and artificial intelligence techniques to translate raw system level text to contextualized, personalized and colloquial format.

Figure 6:
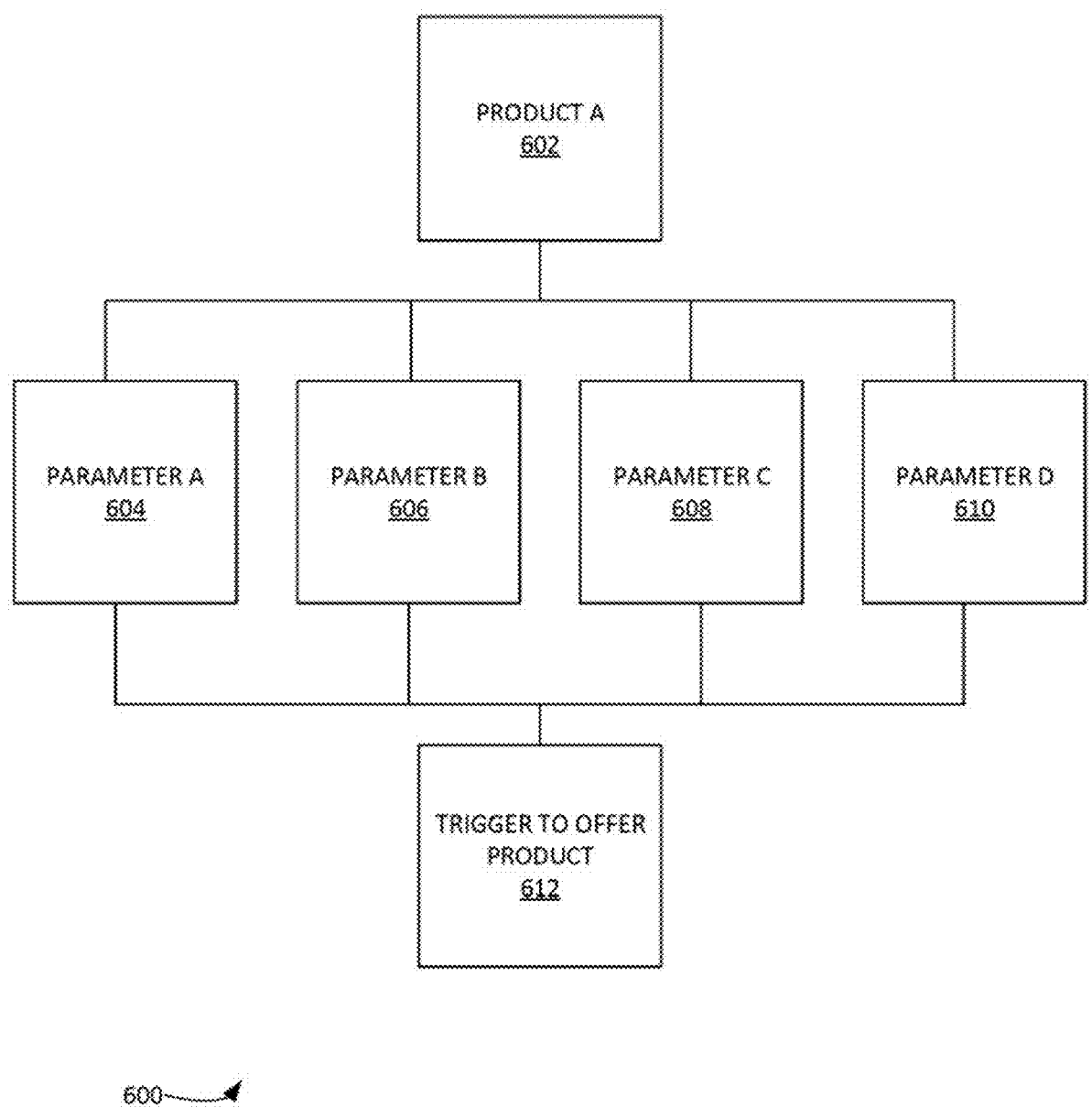
FIG. 6 illustrates an example product graph, according to some embodiments.
Figure 7:
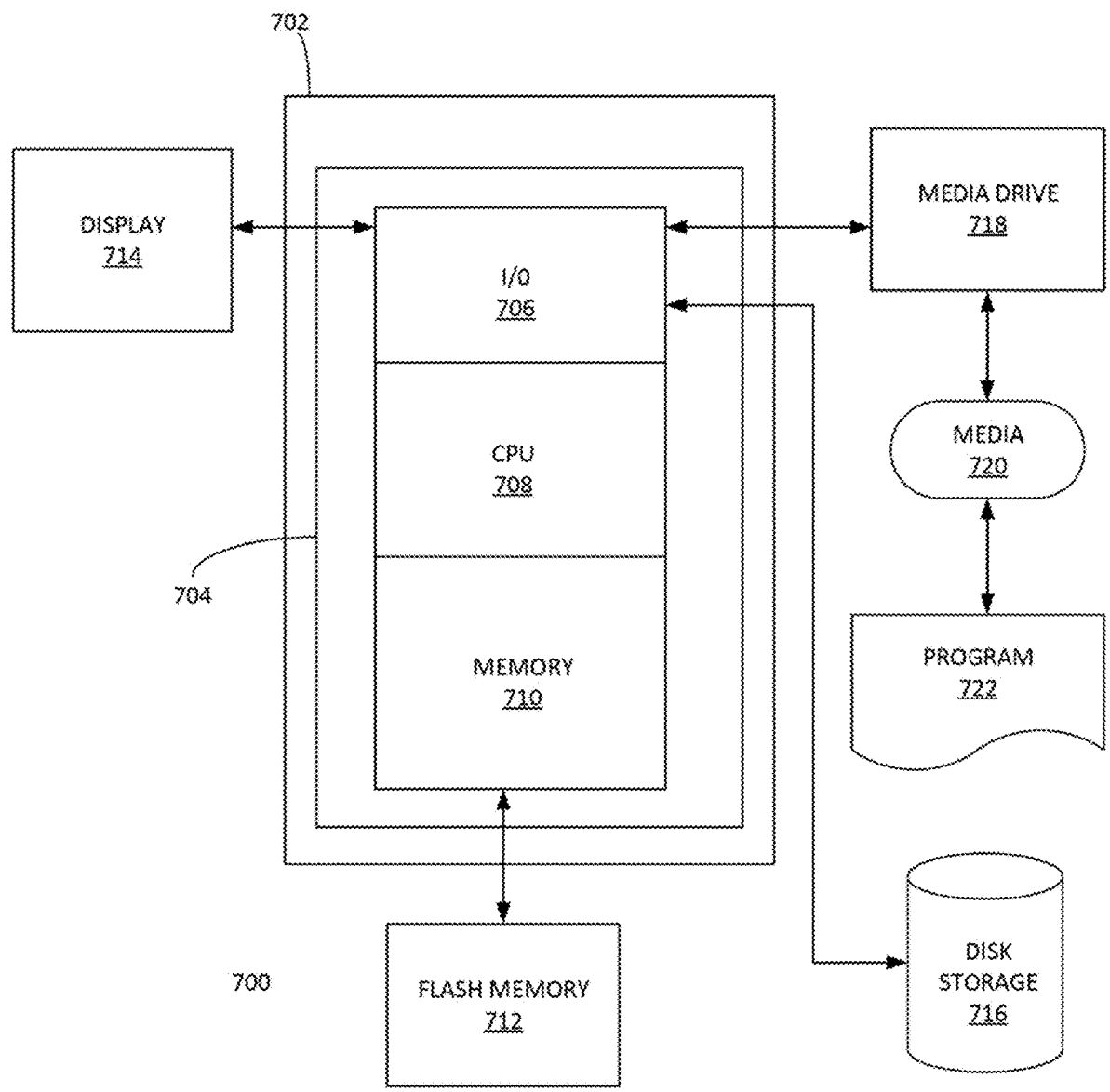
FIG. 7 is a block diagram of a sample-computing environment that can be utilized to implement some embodiments.

FIG. 6 illustrates an example product graph 600, according to some embodiments. Product graph 600 can provide and explain parameters/attributes that are to be satisfied for a product to be offered. For example, in financial services vertical, a 401k distribution calculator service (e.g. product) can have the following parameters/attributes: current age, preferred age of retirement, current 401k saving, annual salary and few other parameters. Product A 602 can be the 401k calculator and parameter 604 to 610 can be its parameters/attributes. Once these parameters are acquired by the conversational search and planning engine via a sequence of interactions, then the system can conclude that the terminal for product 602, in this case 401k calculator, is reached and this product can be offered. In this case the calculation can start, and the projections can be displayed to user. Product graph 600 includes domain specific products but can be adapted to any applicable domain. For example, in fitness vertical half marathon training program can be a product and it can have the following parameters; age, gender, race date, current best record, etc.

Product graph 600 can include one or a plurality of products. Product 602 can have product parameters 604-610. When parameters 604-610 are detected in a series of user and system interactions, conversational-search and planning engine can offer the fulfilled product offering 612 to the user. Node 612 is the terminal/trigger/goal in the product graph. In financial services vertical, for 401k calculator example, this node is reached when all parameters necessary for calculating 401k projections are collected and fulfilled. Once node 612 is reached the system can offer the 401k calculator, in which case, it can start calculating the 401k projections. The conversational search and planning engine strategizes plans based on parameters associated to products in the product graph. A plan is a series of decisions designed to guide the conversation to a direction, the system can collect the parameters associated to a product in the product graph. The goal-based planning can be done by a plurality of planning techniques including but not limited to finding a product with most satisfied parameters, or a variations of extended Partially Observable Markov Decision Process, or Bayesian inferencing, or shortest path by A*, or beam search or a hybrid of such methods. Products that have the least number of unfulfilled parameters can be closer to their corresponding terminals. The conversation graph can implement planning based on product graph.

Additional Embodiments and Examples

In some embodiments, wo types of sequence-to-sequence neural networks can be utilized by a conversational-search engine. A first sequence-to-sequence neural network can generalize actions generated by users. A specific sequence of words from the user action can be translated to a planner query language. For example, "401k vs. IRA" can be translated to "compare 401k to IRA".

Conversational-search engine can use a word-embedding technique. Word embedding can be multidimensional representation of vocabulary (e.g. continuous bag of words, glove, etc.).

Conversational-search engine can use generative methods to translate a colloquial query language to a system level query language. In one example of a utilizing a neural network, the conversational-search engine can provide output to a second neural network to generate a colloquial answer. For example, conversational-search engine can output "401k is pretax, and IRA is post tax". Accordingly, there can be a sequence that the conversational-search engine can would like to translate to a colloquial format. The conversational-search engine can have a set of personal attributes of the user. These personal attributes can be used to personalize the colloquial output. The conversational-search engine can translate the colloquial output to personalized text: "in your case 401k is pretax and IRA is after tax". The conversational-search engine can action/state translated into a personalized-colloquial answer for the user. Another technique in tandem with this can be an adversarial generated network to further check if the output answer is 'good enough' to be dispatched. For example, the conversational-search engine can be paired with a human SME to check output and provide feedback that is fed into a reinforcement learning system. The SME can rev card good answer and penalize bad answers.

In one example, a user can generate an action. The conversational-search engine can then seek to return a decision. A decision is generated by the conversational-search engine and can be altered by human subject matter experts. The action can be canonicalized (e.g. spell checking, dean up text, etc.) and generalized by a neural network. The action can also be generalized. The generalized action is queried over a knowledge graph. The decision can into a generator neural network. The generator decision can be rewarded/penalized and/or altered by SME. The final decision is sent to user (e.g. rendered for display on computer display device, audio output, etc.).

In one example, conversational-search engine can proactively plan a strategy to reach a product terminal node in a conversation graph. The conversational-search engine can determine the nearest terminal node (e.g. a product node). Distance can be quantified as a number of hops to each terminal node in product graph. For example, in financial services vertical, college loan rate calculator can have multiple parameters like current interest rate, remaining amount, credit score, etc. If any of such parameters are already acquired and fulfilled, then the distance to the terminal node for this product can be reduced by the number of already collected parameters. Additionally, it can be determined if terminal node is viable (e.g. is a probability based on what acquired thus far based on number of steps away). If 'yes' then conversational-search engine can begin querying the user regarding the product parameters if a terminal node is too far away (e.g. greater than a specified number of hops) then conversational-search engine can wait a certain number of interactions with the user before start building a strategy. For example, the conversational-search engine can continue in a reactive mode (e.g. simple question and answering).

Figure 8:
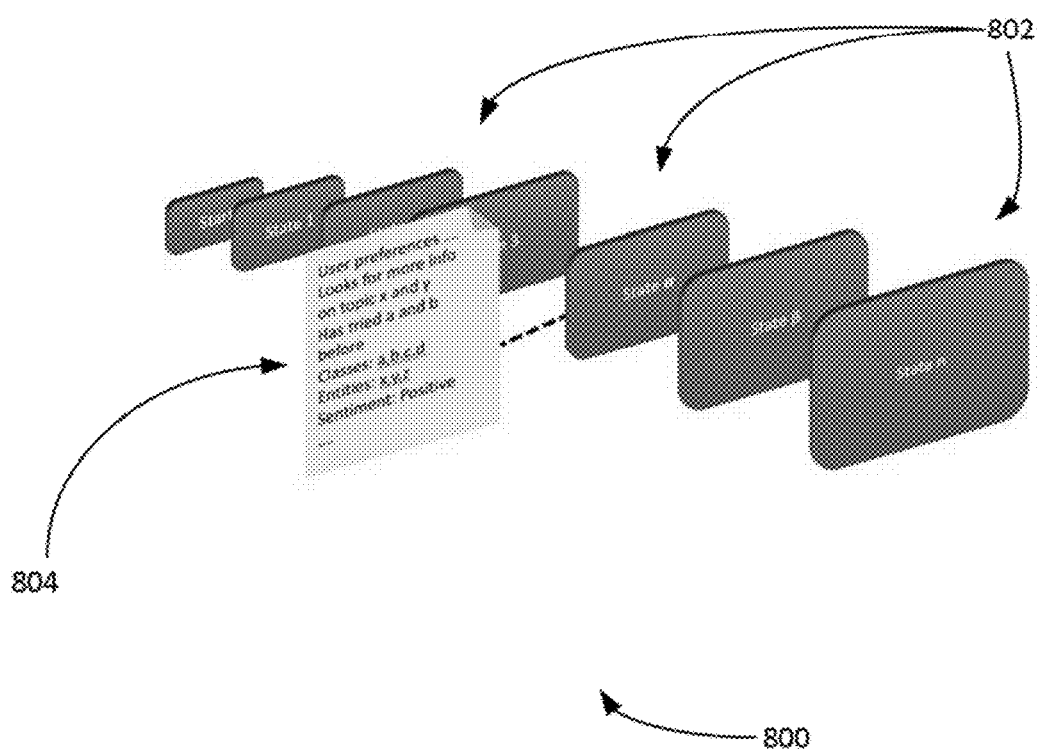
FIG. 8 illustrates an example schematic depiction of a conversation as a sequence of states, according to some embodiments.

FIG. 8 illustrates an example schematic depiction of a conversation 800 a sequence of states 802, according to some embodiments. As shown by way of example in FIG. 8, a conversation can be modeled as a sequence of states 802 e.g. starting from state 0 and proceeding to state n). Once an input or query is generated by a user, the system care react to it. Accordingly, the system the conversation to a new state. The state has many variables 804 associated to it, including, inter alia: classes, entities, sentiment, translation, canonicalized parts/chunks, history and projected future(s).

Figure 9:
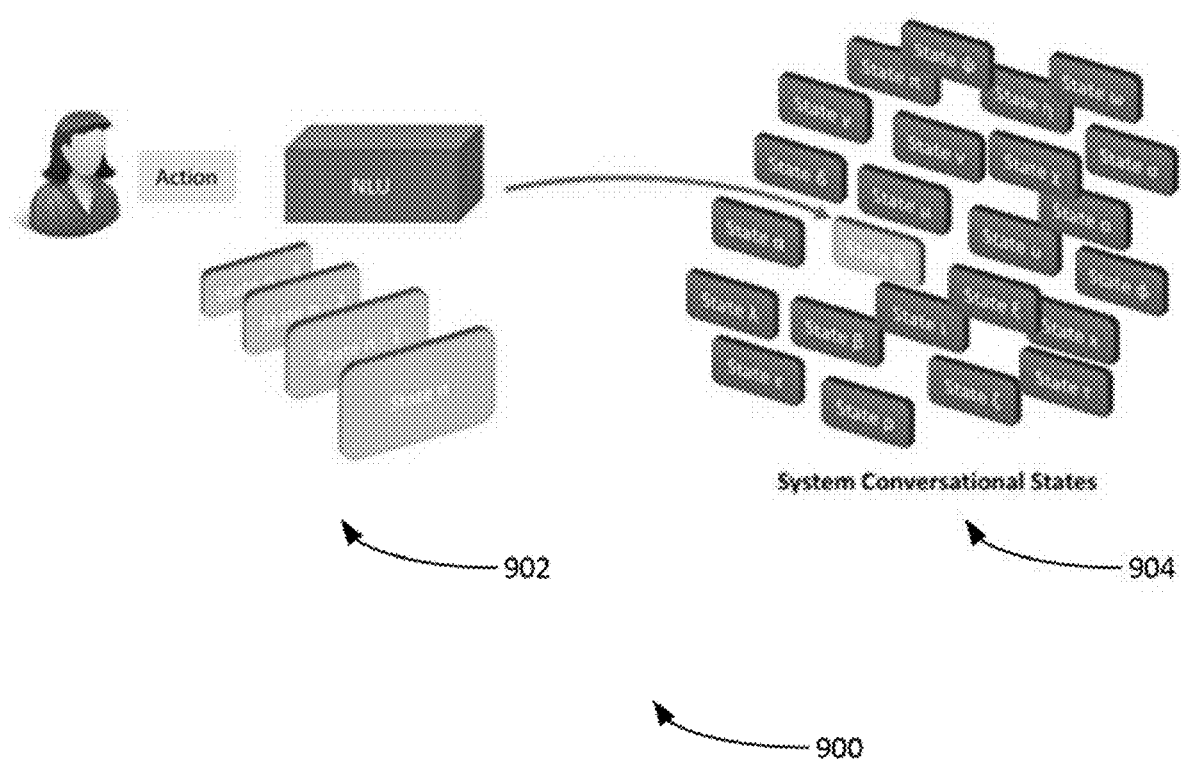
FIG. 9 illustrates an example implementation of an NLU system, according to some embodiments.

FIG. 9 illustrates an example implementation of an NLU system 900, according to some embodiments. As depicted in the FIG. 9, NLU is responsible to draw patterns, entities, classes, canonicalized and summarized parts, to a state to which the system can react. The system uses processed input in conjunction with the preceding states to better map the processed input to a future state, the left-hand side a sequence of conversation states, starting with greeting or state zero and continuing to state n, being the current/latest state of the conversation prior to processing of the incoming action from user. The aggregated conversation state(s) (e.g. context) 902, plus the understood and processed action, can be mapped to equal/similar state within the space model 904:

(context+*processed_action=*state in space model)+*and=*are VSM plus and equality It is noted that this translation and querying of the space model adds an additional layer of security and clarity to the NLU system 900. For example, the NLU system 900 draws patterns from the aggregated conversation state(s) 902 of the left-hand side of FIG. 9 plus the latest received action from the user and determines an equivalent for this new tensor in space model 904 of the right-hand side. The space model 904 can be pre-processed and curated. In one example, the space model 904 can be known, the aggregated conversation 902 can be deduced. This mapping reduces the inherent vagueness of the Al blackbox and adds ore light to what the system is actually undertaking.

Figure 10:
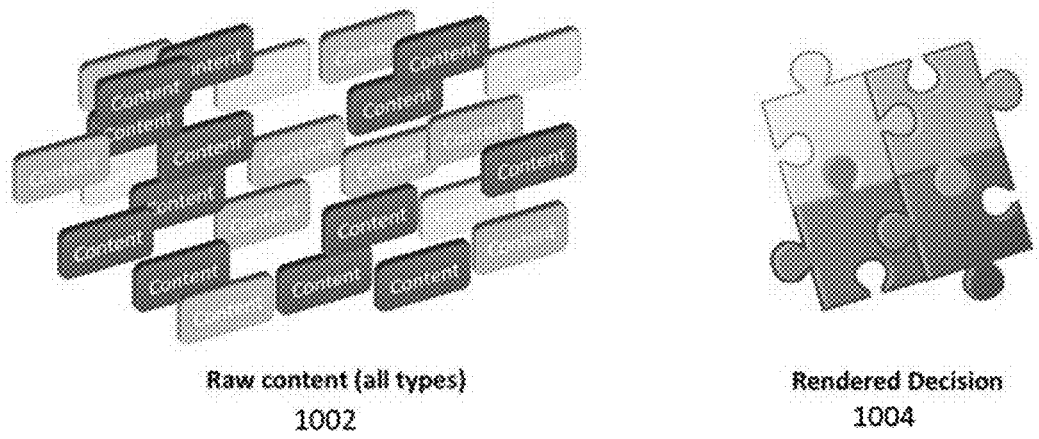
FIG. 10 illustrates an example schematic diagram illustrating an example target state/decision, according to some embodiments.

FIG. 10 illustrates an example schematic diagram illustrating an example target state/decision 1000, according to some embodiments. As depicted, the target state/decision 1000 can be rendered using multiple pieces of raw content.

Exemplary Environment and Architecture

Figure 11:
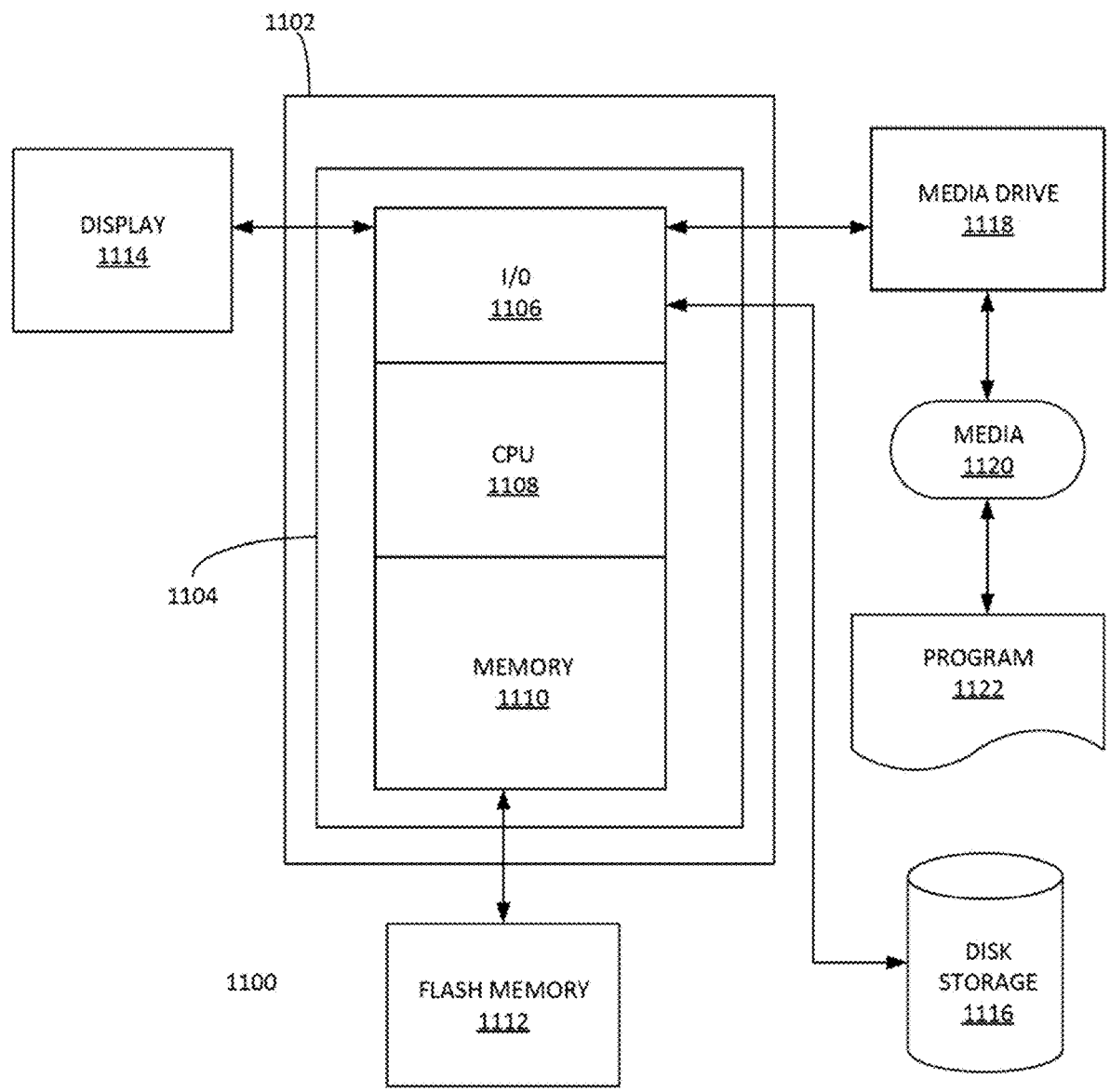
FIG. 11 depicts an exemplary computing system that can be configured to perform any one of the processes provided herein.

FIG. 11 depicts an exemplary computing system 1100 that can be configured to perform any one of the processes provided herein. In this context, computing system 1100 may include, for example, a processor, memory, storage, and I/O devices (e.g., monitor, keyboard, disk drive, Internet connection, etc.). However, computing system 1100 may include circuitry or other specialized hardware for carrying out some or all aspects of the processes. In some operational settings, computing system 1100 may be configured as a system that includes one or more units, each of which is configured to carry out some aspects of the processes either in software, hardware, or some combination thereof.

FIG. 11 depicts computing system 1100 with a number of components that may be used to perform any of the processes described herein. The main system 1102 includes a motherboard 1104 having an I/O section 1106, one or more central processing units (CPU) 1108, and a memory section 1110, which may have a flash memory card 1112 related to it. The I/O section 1106 can be connected to a display 1114, a keyboard and/or other user input (not shown), a disk storage unit 1116 and a media drive unit 1118. The media drive unit 1118 can read/write a computer-readable medium 1120, which can contain programs 1122 and/or data. Computing system 1100 can include a web browser. Moreover, it is noted that computing system 1100 can be configured to include additional systems in order to fulfill various functionalities. Computing system 1100 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Additional Example Processes

Figure 12A:
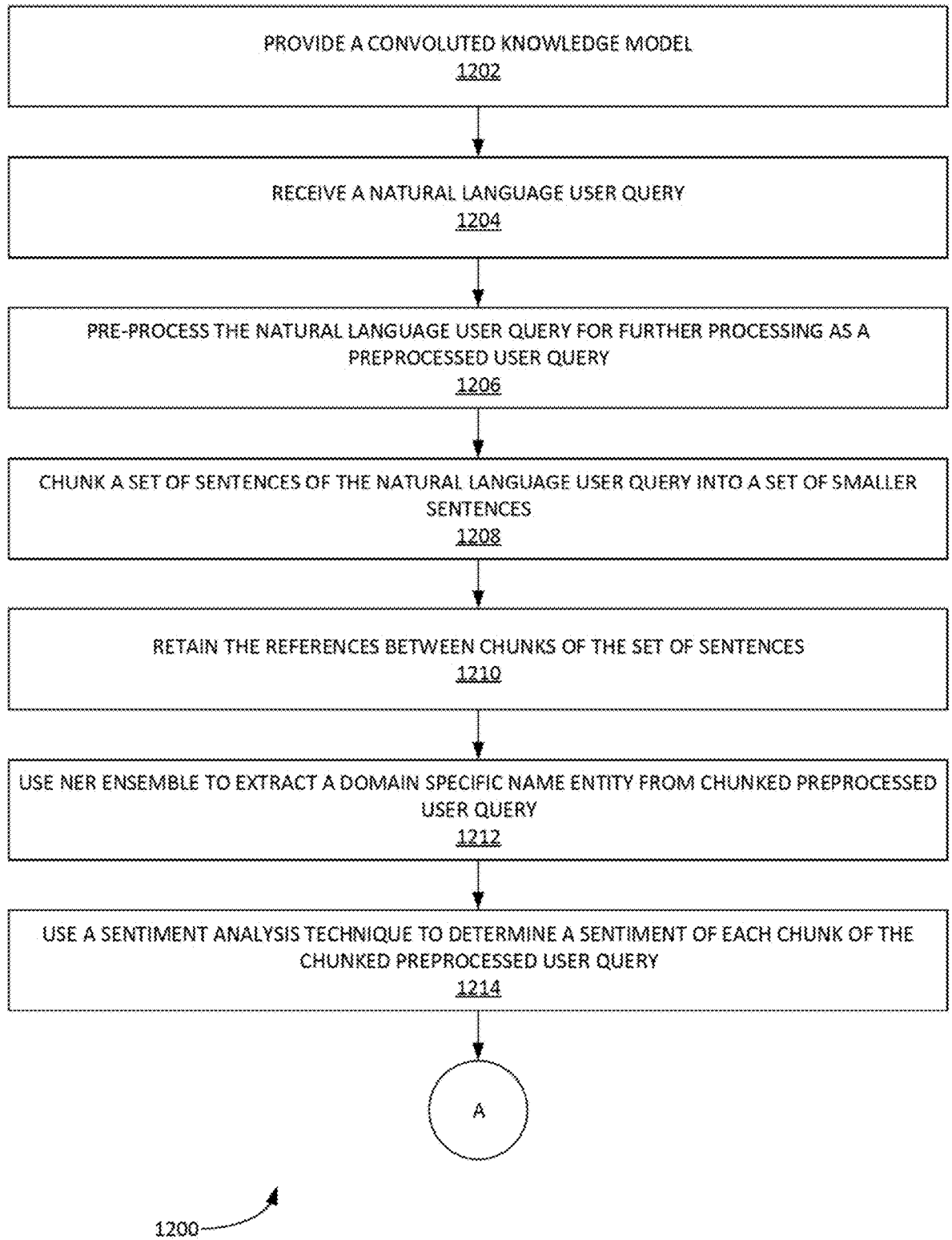
FIGS. 12 A-B illustrate an example process useful for, with an ensemble of Natural Language Understanding and Processing methods, converting a set of user actions into one or more machine queries over a convoluted data model, according to some embodiments.
Figure 12B:
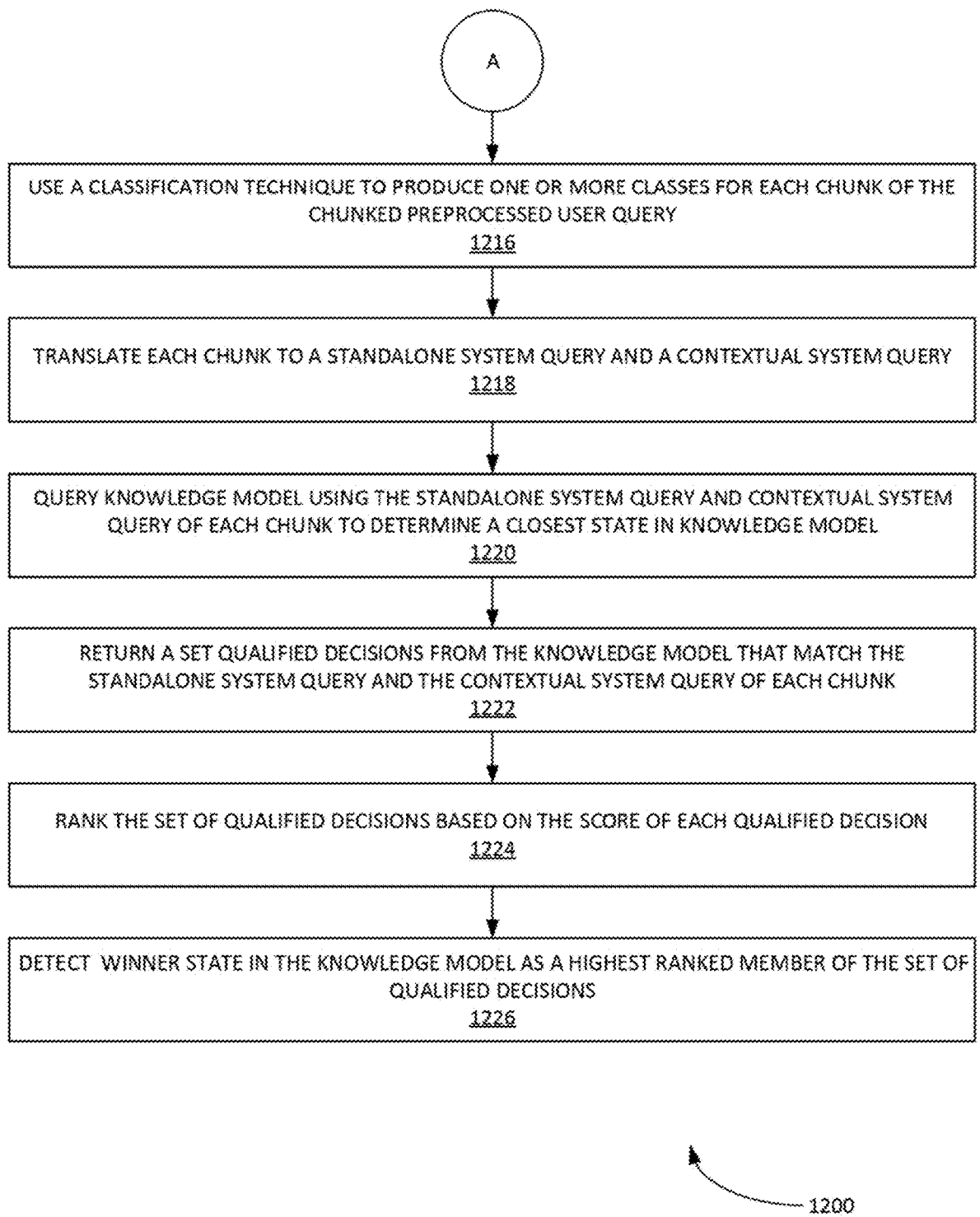

FIGS. 12 A-B illustrate an example process 1200 useful for, with an ensemble of Natural Language Understanding and Processing methods, converting a set of user actions into one or more machine queries over a convoluted data model, according to some embodiments. In step 1202, process 1200 can provide a convoluted knowledge model. In step 1204, process 1200 can receive a natural language user query.

In step 1206, process 1200 can preprocess the natural language user query for further processing as a preprocessed user query. The preprocessing can include various steps as follows. In step 1208, process 1200 can chunk a set of sentences of the natural language user query into a set of smaller sentences. In step 1210, process 1200 can retain the references between chunks of the set of sentences.

With the preprocessed user query, for each chunk of the chunked preprocessed user query process 1200 can perform the following steps. In step 1212, process 1200 can use a Name Entity Recognition (NER) ensemble to extract a domain specific name entity from the chunked preprocessed user query. In step 1214, process 1200 can use a sentient analysis technique to determine a sentiment of each chink of the chunked preprocessed user query. In step 1216, process 1200 can use a classification technique to produce one or more classes for each chunk of the chunked preprocessed user query.

For each chunk, process 1200 can perform the following steps. In step 1218, process 1200 can translate each chunk to a standalone system query and a contextual system query. In step 1220, process 1200 can query the knowledge model using the standalone system query and the contextual system query of each chunk to determine a closest state in the knowledge model. In step 1222, process 1200 can return set qualified decisions from the knowledge model that match the standalone system query and the contextual system query of each chunk. Each qualified decision is scored. In step 1224, process 1200 can rank the set of qualified decisions based on the score of each qualified decision. In step 1226, process 1200 can detect a winner state in the knowledge model as a highest ranked member of the set of qualified decisions.

CONCLUSION

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java, Python) and/or some specialized application-specific language (PHP, JavaScript, XML, JSON). It is noted that JavaScript has been used as an example in several embodiments. However, in other embodiments, another scripting language and/or JavaScript variant can be utilized as well.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:
1. A computerized method useful for, with an ensemble of Natural Language Understanding and Processing methods, converting a set of user actions into one or more machine queries over a convoluted data model, comprising:
providing a convoluted knowledge model, wherein the convoluted knowledge model stores a set of system states, wherein a system state comprises a hyper state, wherein each hyper state comprises a set of nested states, wherein each nested state of the set of nested states comprises another nested set of sets, wherein a structure of the set of nested states does not comprise a set of branches of a tree structure, wherein the structure of the set of nested states is a mappable to a graph, wherein a natural language user query is queried over a vector space model comprising the set of system states, wherein a tiebreaker is learned for cases when more than one system state is qualified as a winner for the natural language user query with a similar score that is within a learnable margin;
receiving a natural language user query;
preprocessing the natural language user query for further processing as a preprocessed user query, wherein the preprocessing comprises;
chunking a set of sentences of the natural language user query into a set of smaller sentences, and retaining a set of references between chunks of the set of sentences;

with the preprocessed user query, for each chunk of the chunked preprocessed user query:

using a Name Entity Recognition (NER) ensemble to extract a domain specific name entity from the chunked preprocessed user query, using a sentiment analysis technique to determine a sentiment of each chunk of the chunked preprocessed user query, using a classification technique to produce one or more classes for each chunk of the chunked preprocessed user query, for each chunk:

translating each chunk to a standalone system query and a contextual system query, querying the convoluted knowledge model using the standalone system query and the contextual system query of each chunk to determine a closest state in the knowledge model, returning a set qualified decisions from the convoluted knowledge model that match the standalone system query and the contextual system query of each chunk, wherein each qualified decision is scored, ranking the set of qualified decisions based on the score of each qualified decision, and detecting a winner state in the convoluted knowledge model as a highest ranked member of the set of qualified decisions, and wherein the tiebreaker uses an attention vector mechanism to provide a weight vector to all the nested states of a qualified winning state within the vector space model, wherein the attention vector is learned and trained by inputs from a reinforced machine learning model, wherein a tie breaking formula used to determine the tiebreaker comprises:

if count(win state)>1=>win state=tie breaker(win states)

distance=tie break winner=min (distance$^{count\ of\ unfulfilled\ substates}$) for all win states.

2. The computerized method of claim 1, wherein the contextual system query comprises a set of variables used to query the knowledge model in a vector space model.

3. The computerized method of claim 2, wherein the standalone system query comprises a translated query using data provided by the user without using a contextual state data to produce a qualified state in the knowledge model.

4. The computerized method of claim 3, wherein the NER ensemble is used to locate and classify a set of named entities into pre-defined categories.

5. The computerized method of claim 4, wherein the knowledge model comprises a model that represents knowledge in the form of states in a Vector Space Model represented by tensors or a set of vectors or variables.

6. The computerized method of claim 5, wherein the winner state is derived using a scoring model based on a cosine similarity distance and a soft cosine similarity distance between the contextual system query, the context-free system query and the knowledge model state.

7. The computerized method of claim 5, wherein the system states are atomic states or hybrid states.

8. The computerized method of claim 6, wherein the system states are represented by tensors or set of variables n a vector space model.

9. The computerized method of claim 6, wherein the winner state updates a context object, and wherein the context object is used for a future contextual query or a successive chunk.

10. A computerized system useful for, with an ensemble of Natural Language Understanding and Processing methods converting a set of user actions into machine queries, comprising:

at least one processor configured to execute instructions;

a memory containing instructions when executed on the processor, causes the at least one processor to perform operations that:

provides a convoluted knowledge model, wherein the convoluted knowledge model stores a set of system states, wherein a system state comprises a hyper state, wherein each hyper state comprises a set of nested states, wherein each nested state of the set of nested states comprises another nested set of sets, wherein a structure of the set of nested states does not comprise a set of branches of a tree structure, wherein the structure of the set of nested states is a mappable to a graph, wherein a natural language user query is queried over a vector space model comprising the set of system states, wherein a tiebreaker is learned for cases when more than one system state is qualified as a winner for the natural language user query with a similar score that is within a learnable margin;

receives a natural language user query;

preprocesses the natural language user query for further processing as a preprocessed user query, wherein the preprocessing comprises;

chunks a set of sentences of the natural language user query into a set of smaller sentences, and retains a set of references between chunks of the set of sentences;

with the preprocessed user query, for each chunk of the chunked preprocessed user query:

uses a Name Entity Recognition (NER) ensemble to extract a domain specific name entity from the chunked preprocessed user query, uses a sentiment analysis technique to determine a sentiment of each chunk of the chunked preprocessed user query, uses a classification technique to produce one or more classes for each chunk of the chunked preprocessed user query, for each chunk:

translates each chunk to a standalone system query and a contextual system query, queries the convoluted knowledge model using the standalone system query and the contextual system query of each chunk to determine a closest state in the knowledge model, returns a set qualified decisions from the convoluted knowledge model that match the standalone system query and the contextual system query of each chunk, wherein each qualified decision is scored, ranks the set of qualified decisions based on the score of each qualified decision, and detects a winner state in the convoluted knowledge model as a highest ranked member of the set of qualified decisions, and wherein the tiebreaker uses an attention vector mechanism to provide a weight vector to all the nested states of a qualified winning state within the vector space model, wherein the attention vector is learned and trained by inputs from a reinforced machine learning model, wherein a tie breaking formula used to determine the tiebreaker comprises:

if count(win state)>1=>win state=tie breaker(win states)

distance=tie break winner=min (distance$^{count\ of\ unfulfilled\ substates}$) for all win states.

11. The computerized system of claim 10, wherein the contextual system query comprises a set of variables used to query the knowledge model in a vector space model.

12. The computerized system of claim 11, wherein the standalone system query comprises a translated query using data provided by the user without using a contextual state data to produce a qualified state in the knowledge model.

13. The computerized system of claim 12, wherein the NER ensemble is used to locate and classify a set of named entities into pre-defined categories.

14. The computerized system of claim 13, wherein the knowledge model comprises a model that represents knowledge in the form of states in a Vector Space Model represented by tensors or a set of vectors or variables.

\* \* \* \* \*